United States Patent
Ji et al.

(10) Patent No.: US 10,771,140 B2
(45) Date of Patent: Sep. 8, 2020

(54) SELECTIVE CHANNEL FEEDBACK METHOD AND APPARATUS FOR USE IN WIRELESS COMMUNICATION SYSTEM

(71) Applicant: Samsung Electronics Co., Ltd., Gyeonggi-do (KR)

(72) Inventors: Hyoungju Ji, Seoul (KR); Younsun Kim, Gyeonggi-do (KR); Youngbum Kim, Seoul (KR); Hyojin Lee, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 296 days.

(21) Appl. No.: 14/703,123

(22) Filed: May 4, 2015

(65) Prior Publication Data
US 2015/0319633 A1    Nov. 5, 2015

(30) Foreign Application Priority Data
May 2, 2014 (KR) .......................... 10-2014-0053255

(51) Int. Cl.
*H04W 24/08* (2009.01)
*H04B 7/06* (2006.01)
(Continued)

(52) U.S. Cl.
CPC ......... *H04B 7/0619* (2013.01); *H04B 7/0452* (2013.01); *H04B 7/0456* (2013.01);
(Continued)

(58) Field of Classification Search
None
See application file for complete search history.

(56) References Cited

U.S. PATENT DOCUMENTS

2010/0166038 A1*   7/2010   Lee ...................... H04B 7/0626
                                                     375/130
2010/0173659 A1*   7/2010   Shin ..................... H04B 7/0452
                                                     455/500
(Continued)

FOREIGN PATENT DOCUMENTS

CN       102792616      11/2012
WO    WO 2011/103368     8/2011

OTHER PUBLICATIONS

International Search Report dated Aug. 10, 2015 issued in counterpart application No. PCT/KR2015/004465, 4 pages.
(Continued)

*Primary Examiner* — Anh Vu H Ly
*Assistant Examiner* — Hector Reyes
(74) *Attorney, Agent, or Firm* — The Farrell Law Firm, P.C.

(57) ABSTRACT

Systems, base stations, terminals, and methods for group-selective channel feedback in a wireless communication system are described. In one signal measurement method for a base station supporting Multiuser Multiple-Input Multiple-Output (MU-MIMO), the base station allocates a group identifier to a terminal group for performing and reporting signal measurements simultaneously. When the base station transmits control information including the group identifier, each one of terminals belonging to the terminal group performs signal measurement, generates signal measurement feedback, and simultaneously transmits the signal measurement feedback to the base station.

16 Claims, 16 Drawing Sheets

(51) Int. Cl.
*H04W 24/10* (2009.01)
*H04W 72/04* (2009.01)
*H04B 7/0452* (2017.01)
*H04B 7/0456* (2017.01)
*H04J 11/00* (2006.01)
*H04L 5/00* (2006.01)
*H04W 72/12* (2009.01)

(52) U.S. Cl.
CPC .......... *H04B 7/063* (2013.01); *H04B 7/0617* (2013.01); *H04B 7/0626* (2013.01); *H04B 7/0632* (2013.01); *H04B 7/0639* (2013.01); *H04J 11/0026* (2013.01); *H04J 11/0043* (2013.01); *H04L 5/005* (2013.01); *H04L 5/0057* (2013.01); *H04L 5/0073* (2013.01); *H04W 24/08* (2013.01); *H04W 24/10* (2013.01); *H04W 72/0413* (2013.01); *H04W 72/1231* (2013.01)

(56) References Cited

U.S. PATENT DOCUMENTS

| | | | |
|---|---|---|---|
| 2010/0272019 A1* | 10/2010 | Papasakellariou | H04B 7/0417 370/328 |
| 2010/0278109 A1* | 11/2010 | Papasakellariou | H04L 5/0037 370/328 |
| 2011/0075607 A1 | 3/2011 | Kim et al. | |
| 2011/0080965 A1 | 4/2011 | Liu et al. | |
| 2011/0170496 A1 | 7/2011 | Fong et al. | |
| 2011/0199946 A1 | 8/2011 | Breit et al. | |
| 2012/0026991 A1* | 2/2012 | Niu | H04B 7/0417 370/338 |
| 2012/0057482 A1 | 3/2012 | Geirhofer et al. | |
| 2012/0163483 A1* | 6/2012 | Stacey | H04B 7/0452 375/260 |
| 2012/0177018 A1 | 7/2012 | Abraham et al. | |
| 2012/0270535 A1 | 10/2012 | Chen et al. | |
| 2013/0064128 A1* | 3/2013 | Li | H04B 7/065 370/252 |
| 2013/0114533 A1 | 5/2013 | Ji et al. | |
| 2013/0114655 A1* | 5/2013 | Gomadam | H04B 7/0456 375/219 |
| 2014/0010126 A1 | 1/2014 | Sayana et al. | |
| 2014/0010216 A1 | 1/2014 | Niu et al. | |
| 2014/0057640 A1 | 2/2014 | Nagata et al. | |
| 2014/0064201 A1 | 3/2014 | Zhu et al. | |
| 2014/0098689 A1* | 4/2014 | Lee | H04B 7/0469 370/252 |
| 2015/0244444 A1* | 8/2015 | Mazzarese | H04B 7/04 370/252 |

OTHER PUBLICATIONS

Joonsuk Kim et al., "GroupID Concept for Downlink MU-MIMO Transmission", IEEE 802.11-10/0073r0, XP-002652701, Jan. 18, 2010, 8 pages.
Patil Sandhya et al., Comment Resolution for CIDs: 2110, 3578, 2288, IEEE P802.11 Wireless LANs, IEEE 802.11-11/1538rl, Nov. 7, 2011, 5 pages.
Lingjia Liu et al., "Downlink MIMO in LTE-Advanced: SU-MIMO vs. MU-MIMO", LTE Advanced and 4G Wireless Communications, IEEE Communications Magazine, Feb. 2012, 8 pages.
European Search Report dated Dec. 15, 2017 issued in counterpart application No. 15786820.9-1874, 10 pages.
Chinese Office Action dated Nov. 4, 2019 issued in counterpart application No. 201580023636.0, 25 pages.
Joonsuk Kim et al., "GroupID Concept for Downlink MU-MIMO Transmission", IEEE 802.11-10/0073r2, Mar. 15, 2010, 10 pages.
Chinese Office Action dated Apr. 21, 2020 issued in counterpart application No. 201580023636.0, 24 pages.
Indian Office Action dated Jun. 8, 2020 issued in counterpart application No. 201637037354, 5 pages.

\* cited by examiner

SELECTIVE CHANNEL FEEDBACK METHOD AND APPARATUS FOR USE IN WIRELESS COMMUNICATION SYSTEM

PRIORITY

This application claims priority under 35 U.S.C. § 119(a) to Korean Patent Application No. 10-2014-0053255, filed on May 2, 2014, the entire disclosure of which is incorporated herein by reference.

BACKGROUND OF THE INVENTION

1. Field of the Invention

The present invention relates generally to a selective channel feedback method and apparatus for use in a wireless communication system and, more particularly, to a feedback method for supporting Multi-user Multiple Input Multiple Output (MU-MIMO) within a cell in which a base station commands a plurality of terminals to transmit channel information simultaneously and in which each terminal feeds back channel information and/or multi-user interference information based on the command.

2. Description of the Related Art

Mobile communication systems were developed to provide mobile users with communication services. With the rapid advance of technologies, the mobile communication systems have evolved to the level capable of providing high speed data communication service beyond the early voice-oriented services.

Recently, standardization for the Long Term Evolution (LTE) system, as one of the next-generation mobile communication systems, is underway in the $3^{rd}$ Generation Partnership Project (3GPP). LTE is a technology for realizing high-speed packet-based communications with the data rate of up to 100 Mbps, which is higher than the currently available data rate, and its standardization is almost complete. In line with the completion of the standardization of LTE, the discussion focus is shifted to LTE-Advanced (LTE-A) for increasing the data rate by adopting new technologies. The term "LTE system" as used herein may be construed to include the legacy LTE system and the LTE-A system.

LTE systems support Multi-user Multiple Input Multiple Output (MU-MIMO) which, among other things, allows multiple transmitters to send separate signals and multiple receivers to receive separate signals simultaneously in the same band. For MU-MIMO scheduling, the base station has to measure inter-terminal interference. However, since the terminals in the base station's cell change at every transmission timing and interference between terminals varies continuously, it is difficult for the base station to predict inter-terminal interference and make interference measurements. For interference measurement in a MU-MIMO system, the base station has to transmit a command in a control channel to the terminals to command the terminals to transmit feedback. However, simultaneously transmitting the feedback commands to all of the terminals in the MU-MIMO system significantly increases the control channel overload, which can result in transmission failure. In order to solve this problem, individual feedback commands could be transmitted over the control channel to the terminals in sequence. However, if the base station commands the terminals to perform feedback in sequence, it is difficult to measure the interference accurately because the inter-terminal interference varies over time, and thus varies during the sequence.

Thus, there is a need for systems, apparatuses (including, but not limited to, base stations and terminals), and methods for efficient and effective interference measurement and for scheduling MU-MIMO transmission based on such interference measurements.

SUMMARY OF THE INVENTION

The present invention has been made to address at least the problems and disadvantages described above and to provide at least the advantages described below. According to one aspect of the invention, a selective channel feedback method and apparatus for use in a wireless communication system are provided.

According to another aspect of the present invention, a control channel transmission method and a resource allocation method of a base station and a control channel reception method and a feedback channel transmission method of a terminal are provided.

According to yet another aspect of the invention, a feedback method for supporting Multi-user Multiple Input Multiple Output (MU-MIMO) within a cell is provided, in which the base station commands a plurality of terminals to transmit channel information simultaneously and in which each terminal feeds back channel information and/or multi-user interference information based on the command.

According to still another aspect of the invention, a method is provided for a base station to receive instantaneous interference information from a plurality of terminals using a common control channel.

According to yet still another aspect of the invention, a base station cane secure control channel resources and receive instantaneous inter-terminal interference information for MU-MIMO.

In accordance with an aspect of the present invention, a channel measurement method is provided for a base station capable of supporting Multiuser Multiple-Input Multiple-Output (MU-MIMO), the method including allocating a group identifier for signal measurement feedback from a plurality of terminals; transmitting control information including the group identifier to instruct the plurality of terminals to perform signal measurement and generate signal measurement feedback; and simultaneously receiving signal measurement feedback from the plurality of terminals.

In accordance with another aspect of the present invention, a channel measurement method is provided for a terminal capable of supporting Multiuser Multiple-Input Multiple-Output (MU-MIMO), the method including receiving control information from a base station including a group identifier instructing the terminal to perform signal measurement and generate signal measurement feedback, wherein the base station previously allocated the group identifier to a plurality of terminals, including the terminal, for signal measurement feedback; performing signal measurement and generating signal measurement feedback; and transmitting the signal measurement feedback to the base station, wherein the plurality of terminals allocated the group identifier perform signal measurement simultaneously and transmit their respective signal measurement feedback simultaneously.

In accordance with another aspect of the present invention, a base station capable of supporting Multiuser Multiple-Input Multiple-Output (MU-MIMO) is provided, including a transceiver and a controller which allocates a group identifier to a plurality of terminals for signal measurement feedback; and controls the transceiver to transmit control information including the group identifier to instruct the plurality of terminals to perform signal measurement and generate signal measurement feedback, wherein the transceiver simultaneously receives signal measurement feedback transmitted by the plurality of terminals allocated the group identifier.

In accordance with another aspect of the present invention, a terminal capable of supporting Multiuser Multiple-Input Multiple-Output (MU-MIMO) is provided, including a transceiver and a controller which, when the transceiver receives control information from a base station including a group identifier instructing the terminal to perform signal measurement and generate signal measurement feedback, controls the terminal to perform signal measurement, generate signal measurement feedback, and to transmit the signal measurement feedback to the base station, wherein the base station previously allocated the group identifier to a plurality of terminals, including the terminal, for signal measurement feedback, and wherein the plurality of terminals allocated the group identifier perform their respective signal measurements simultaneously and transmit their respective signal measurement feedback simultaneously.

BRIEF DESCRIPTION OF THE DRAWINGS

The above and other aspects, features and advantages of certain embodiments of the present invention will become more apparent from the following detailed description taken in conjunction with the accompanying drawings, in which.

DETAILED DESCRIPTION OF EMBODIMENTS OF THE PRESENT INVENTION

Figure 1A:
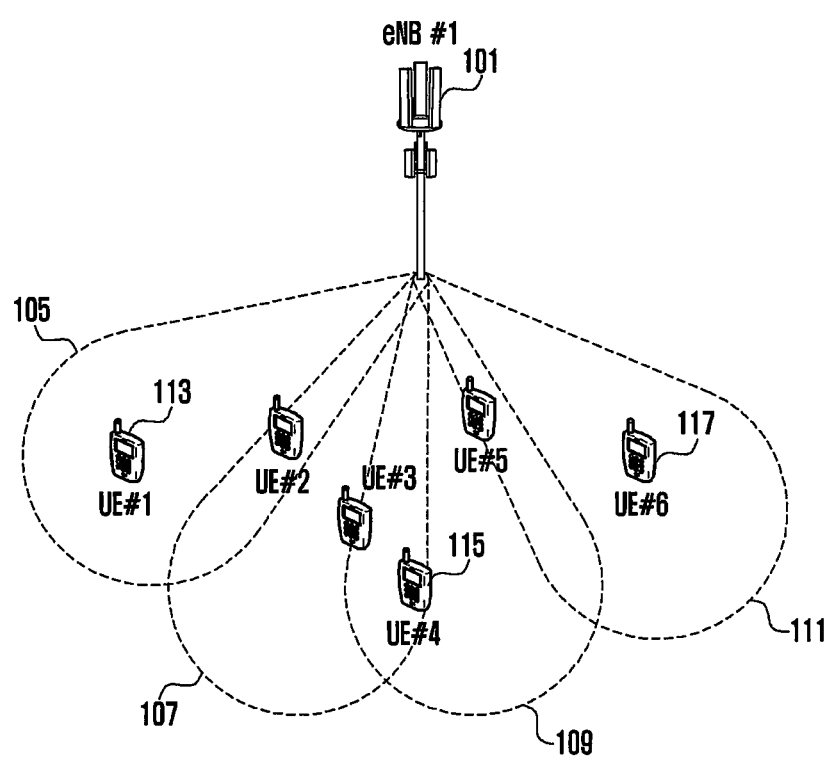
FIGS. 1A and 1B are diagrams showing spatial locations of an evolved Node B (eNB) and User Equipments (UEs) in a cell using MU-MIMO.

Embodiments of the present invention are described in detail with reference to the accompanying drawings. The same or similar reference numbers are used in the drawings to refer to the same or like parts. Detailed descriptions of well-known functions and structures may be omitted herein to avoid obscuring the subject matter of the present invention in unnecessary detail. In the following description, for purposes of explanation, numerous specific details are set forth in order to provide a thorough understanding through specific examples of the claimed subject matter. It should be evident, however, that the claimed subject matter may be practiced without these specific details. In other instances, structures and devices are illustrated in block diagram form in order to facilitate describing the claimed subject matter.

One embodiment of the present invention provides a method and apparatus for group-selective channel feedback in a wireless communication system. According to an embodiment of the present invention, a base station commands a plurality of terminals to simultaneously take signal measurements and then simultaneously feed back signal measurement information (for channels or interference) and thus each terminal may measure one or more channels and inter-terminal interference and transmit signal measurement feedback to the base station in response to the command. The base station performs MU-MIMO transmission using the signal measurement feedback received from the terminals.

One embodiment of the present invention provide a base station with a method of configuring group channel feedback information through higher layer signaling, a method of configuring a common control channel, a method of transmitting a configured control channel in the control channel region, a method of configuring a signal measurement feedback channel and receiving the feedback channel from the terminals, and a method of performing MU-MIMO scheduling based on the received feedback, as part of the operations of the base station for selective channel feedback in a wireless communication system.

For interference measurement, embodiments of the present invention provides a method of configuring group feedback information using higher layer signaling from a base station, a method of receiving a common control channel, a method of recognizing a signal measurement feedback command, a method of measuring channel and interference resources, and a method of feeding back the measurement information, as part of the operation of the terminal for selective channel feedback in a wireless communication system.

Configuring the control information may include preconfiguring a feedback channel region and generating information instructing respective terminals to perform signal measurement feedback.

Transmitting selective signal measurements in a wireless communication system may include transmitting signal measurement feedback on a channel resource using uplink control channel format 3 (PUCCH format 3) according to an indication in received control channel information. Such transmitting may include transmitting first signal measurement information and second signal measurement information in two consecutive frequency resources or two consecutive time resources on an uplink control channel format 3 according to the indication of the received control channel information.

Transmitting selective signal measurements may include transmitting signal measurement feedback using an uplink data channel resource having no data (i.e., data-less PUSCH) according to the indication of the received control channel information. The signal measurement feedback may be transmitted on a preset resource region in the uplink data channel. The signal measurement feedback may be transmitted on a resource region in the uplink data channel determined by an offset indicated by the received control channel information. The signal measurement feedback of several UEs may be transmitted on the same time-frequency resource in the uplink data channel by using different cyclic shifts indicated in the received control channel information.

The signal measurement feedback may include at least one Rank Indicator (RI), at least one Precoder Matrix Indicator (PMI), at least one Single User Channel Quality Indicator (SU-CQI), and/or at least one Multiuser CQI (MU-CQI). The signal measurement feedback may include a CQI offset considering at least one SU-CQI and at least one Multiuser hypothesis.

The signal measurements may be measurements of one or more channels, interference to one or more channels, interference from one interference source, or various combinations of interference sources.

Embodiments of the present invention are provided for use in any communication system in which a base station transmits a downlink signal to a terminal and the terminal transmits an uplink signal to the base station. Although the following embodiments are directed to the LTE system, this is only for convenience of explanation, and the present invention is not limited thereto.

In the following description, the downlink signal from the base station includes one or more reference signals (RS) for channel estimation and channel feedback, a data channel carrying information addressed to the terminal, and a control channel carrying control information (control signal). The base station transmits the data and control information to the terminal through the Physical Downlink Shared Channel (PDSCH) and the Downlink Control Channel (DL CCH), respectively.

The uplink signal from the terminal includes an RS, a data channel, and a control channel. The data channel is transmitted on the Physical Uplink Shared Channel (PUSCH), and the feedback information of the terminal and an acknowledgement of the downlink data channel are transmitted on the Physical Uplink Control Channel (PUCCH).

The base station transmits various types of reference signals including a Common Reference Signal (CRS) which all the terminals within the cell use for channel estimation and data channel demodulation, a Channel State Information Reference Signal (CSI-RS) used for channel measurement, and a Demodulation Reference Signal (DMRS) used for modulating data channel. The CRS is transmitted across whole downlink bandwidth so that all of the terminals within the cell can use it for signal modulation and channel estimation. In order to reduce the resources used for CRS transmission, the base station transmits DMRS in a region scheduled for a terminal. In order to acquire the channel measurement information using the reference signals, the base station configures at least one CSI-RS on the time-frequency grid and transmits the CSI-RS to the terminal. In addition, Channel State Information-Interference Measurement (CSI-IM) may be configured along with the CSI-RS at the resource region for the terminal to measure interference.

Figure 1B:
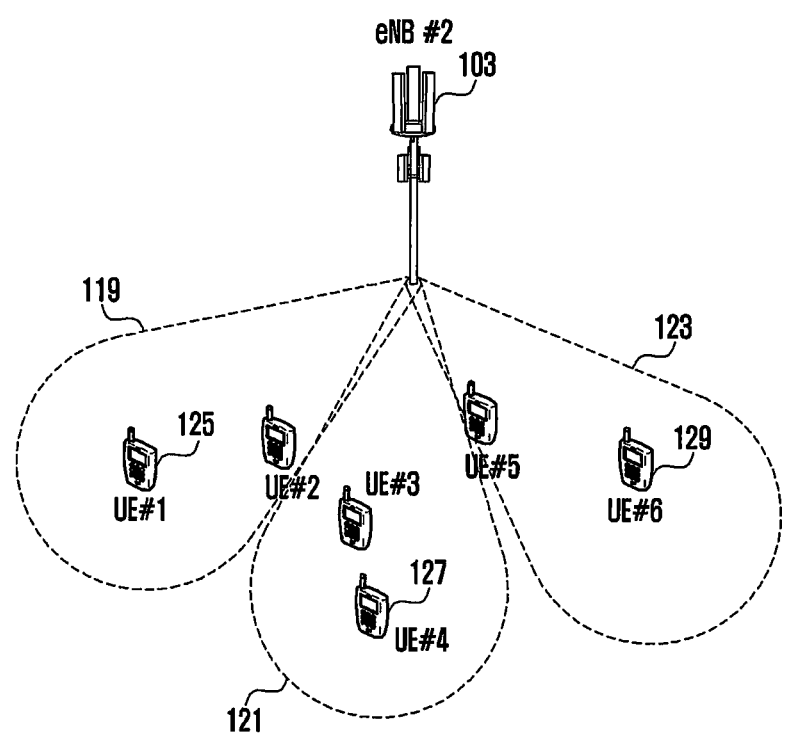

FIGS. 1A and 1B are diagrams showing spatial locations of an evolved Node B (eNB) and User Equipments (UEs) in a cell using MU-MIMO.

In FIG. 1A, the eNB 1 101 is serving a plurality of UEs within its coverage. The eNB 1 101 performs SU-MIMO transmission or MU-MIMO transmission using a plurality of antenna. Based, at least in part, on the channel conditions of the UEs, the eNB 1 101 applies different gains and phase differences to the antennas. The combination of the gain and phase difference applied to the signal before transmission on an antenna is often referred to as "precoding".

In the case of MU-MIMO, if the eNB 1 101 has accurate and up-to-date information on the interference between UEs, it is possible to make link performance more efficient. In order to achieve this, the eNB 1 101 determines a few precodings (four of which, when transmitted, have the coverage indicated by the dotted lines labelled 105, 107, 109, and 111 in FIG. 1A) effective for MU-MIMO transmission and allocates one of them to each UE. The eNB 1 101 instructs each UE to measure the channel for MU-MIMO transmission using the allocated precoding.

In FIG. 1A, the UE 1 113 and UE 6 117 which have positions well-suited for precodings 105 and 111, respectively, may measure interference effectively, but the UE 4 115 which has a position within both precodings 107 and 109 is not suited to be allocated either precoding 107 or precoding 109 and thus may not measure interference effectively.

As shown in FIG. 1B, in order to solve this problem and measure interference effectively, the eNB 2 103 uses suitable precodings having coverage 119, 121, and 123 for UEs 125, 127, and 129, respectively, to measure interference. In order to apply suitable precodings to the respective UEs as shown in FIG. 1B, the eNB 2 103 has to instruct the UE 1 125, UE 4 127, and UE 6 129 so that they measure interference and transmit channel measurement information in sequence. In FIG. 1B, the eNB instructs each UE to perform channel measurement information feedback using Downlink Control Information (DCI) contained in the physical control channel.

Figure 2A:
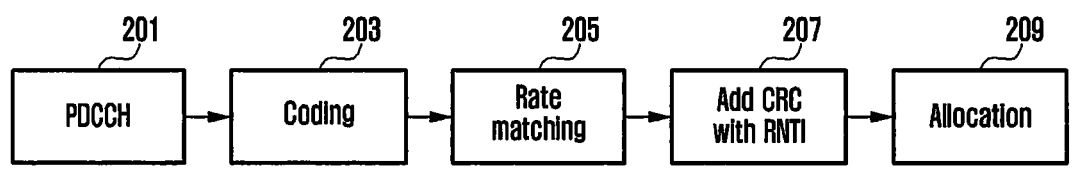
FIG. 2A is a diagram illustrating a process for an eNB to configure a control channel for transmission according to an embodiment of the present invention.
Figure 2B:
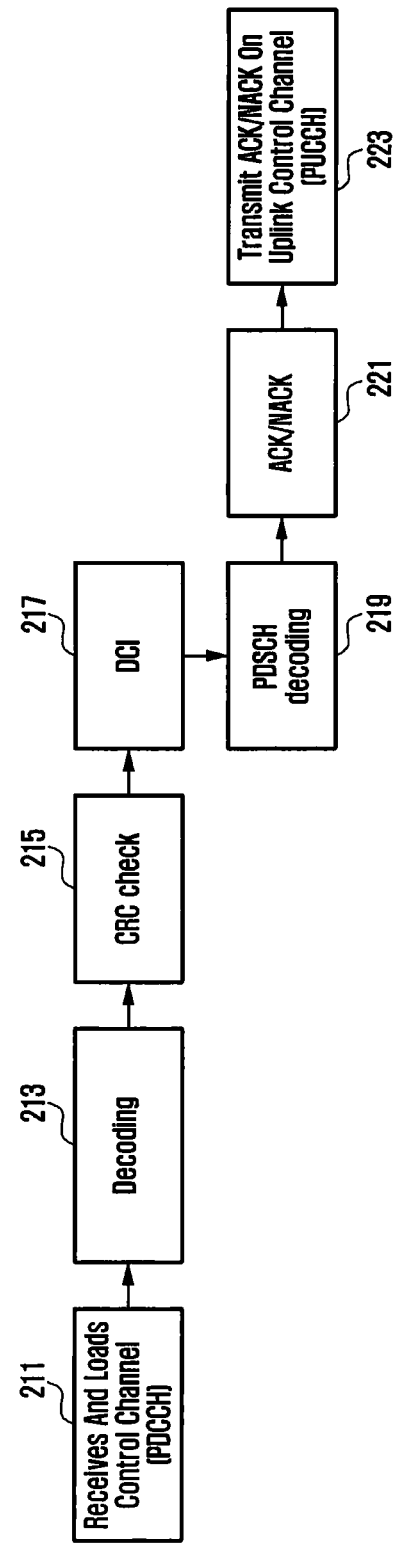
FIG. 2B is a diagram illustrating a process for a UE to handle a received control channel according to an embodiment of the present invention.

FIG. 2A is a diagram illustrating a process for an eNB to configure a control channel for transmission according to an embodiment of the present invention, and FIG. 2B is a diagram illustrating a process for a UE to handle a received control channel according to an embodiment of the present invention.

Referring to FIG. 2A, the eNB configures PDCCH in step 201 and performs coding on the control channel in step 203. The eNB determines a code rate in consideration of the transmission resource amount in step 205. In step 207, the eNB adds the Cyclic Redundancy Check (CRC) and the unique Radio Network Temporary Identifier (RNTI) of a target UE to the coded control channel in order for the target UE to receive the control channel. More specifically, the eNB performs a bit-wise XOR operation on the unique RNTI, i.e., the unique identifier of the target UE, and the CRC, and then adds the operation result to the coded control channel. Each UE is allocated a region in step 209 for receiving the control channel. The eNB arranges the UE-specific control channel corresponding to the UE-specific control channel reception regions, which is allocated, such that each UE can demodulate the control channel in the corresponding control channel reception region.

In FIG. 2B, the UE receives the control channel (i.e., PDCCH) and loads the received control channel at step 211. The control channel includes UE-specific control channel candidate regions. The UE performs blind decoding on all candidate regions of the control channel in step 213. The HE determines whether its own control information is in one of the decoded candidate regions in step 215. This determination is made through a CRC check using the CRC XORed with its own identifier (i.e., RNTI) on each candidate region.

If the UE's own control information is found in step 215, the UE analyzes the Downlink Control Information (DCI) included in the control channel in step 217. Then, in step 219, the UE uses the DCI to receive and decode the data channel scheduled by the eNB, i.e., the PDSCH. Based on whether or not the data was received and decoded successfully, the UE transmits an ACK or NACK (ACK/NACK) in step 221. In step 223, the UE transmits the ACK/NACK to the eNB through the uplink control channel, i.e., PUCCH.

The control channel transmitted by the eNB may be a common control channel or a dedicated control channel. The common control channel carries system information and a paging signal, and the dedicated control channel carries scheduling information for downlink data channel reception or uplink data transmission.

In order to transmit the common control channel and dedicated control channel to the UE, the eNB allocates a part of the control channel region (search space) as a common control channel region (common search space) and transmits the common control channel on the common search space and the dedicated control channel on a UE-specific search space. All of the UEs receive the common control channel on the common control channel region, and each UE receives its dedicated control channel (UE-specific control signal) on its dedicated control channel region (UE-specific search space).

The downlink control channel may be transmitted with a common reference signal or a dedicated reference signal. The eNB may use a common reference signal (CRS) or a dedicated reference signal (DRS). It is determined whether the CRS or the DRS are used based on the type of control channel. The PDCCH uses CRS and ePDCCH uses DRS.

Figure 3:
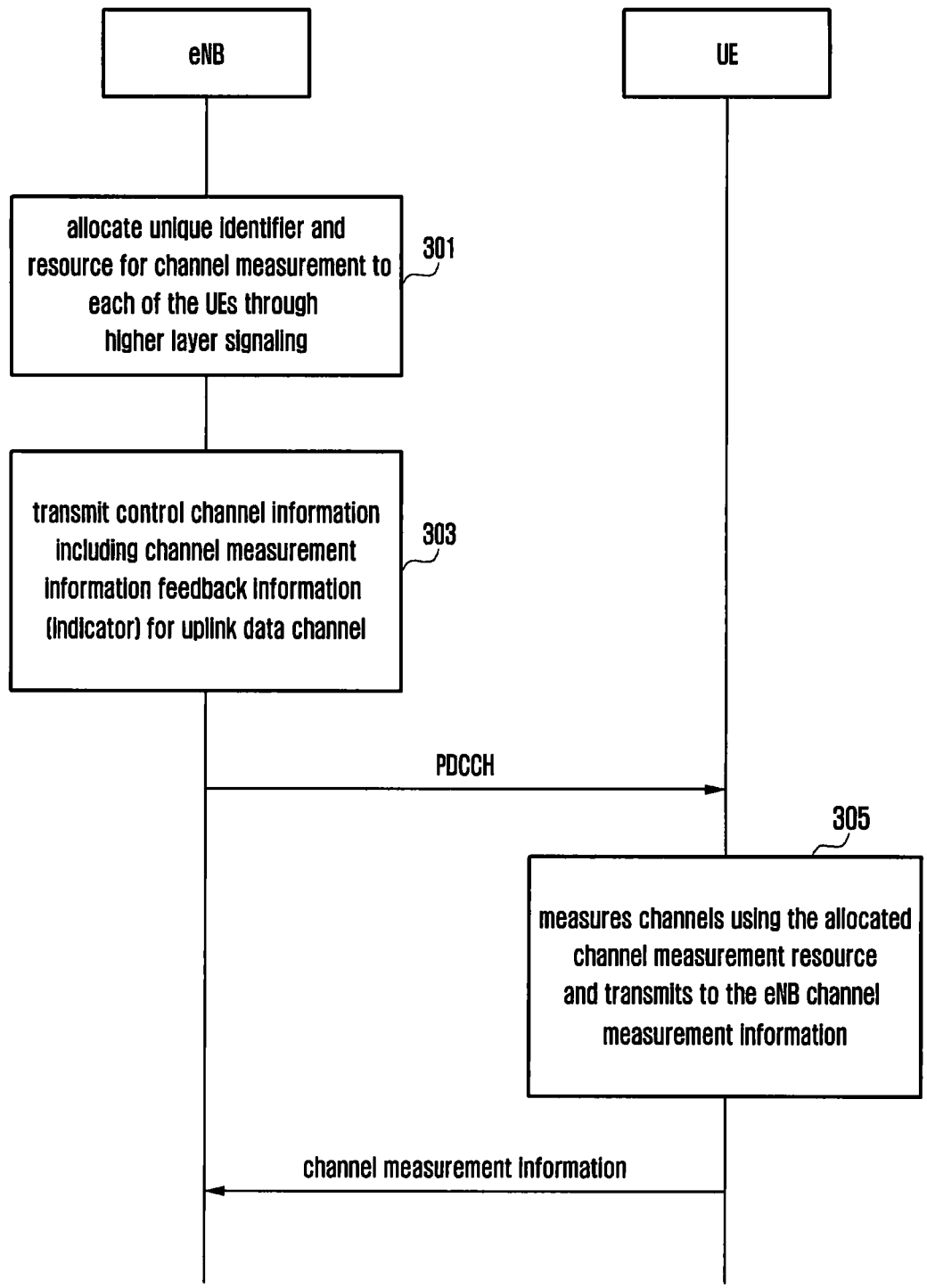
FIG. 3 is a signal flow diagram illustrating a conventional channel measurement feedback method.

FIG. 3 is a signal flow diagram illustrating a conventional channel measurement feedback method.

The eNB allocates unique identifiers, i.e., Cell-RNTI (C-RNTI), to each of the UEs within its cell for use by the UEs in receiving control channels through higher layer signaling in step 301. The eNB also allocates CSI-RS for channel measurement and CSI-IM to the UEs within the cell.

The eNB instructs each UE to perform channel measurement feedback by transmitting control channel information including channel measurement information feedback information (indicator) for uplink data channel at step 303.

If the control information containing the channel measurement information feedback indicator is received, the UE measures channels using the allocated channel measurement resource and transmits to the eNB channel measurement information (or channel information) on the uplink data channel (PUSCH) region indicated in the corresponding control channel at step 305.

The method described above and shown in FIG. 3 is useful for an eNB to instruct a single UE to perform channel measurement, but does not allow the eNB to instruct multiple UEs to perform channel measurement simultaneously. The eNB also has to notify the UE of the interference measurement resource with interference measurement instruction which causes extra resource consumption.

Figure 4:
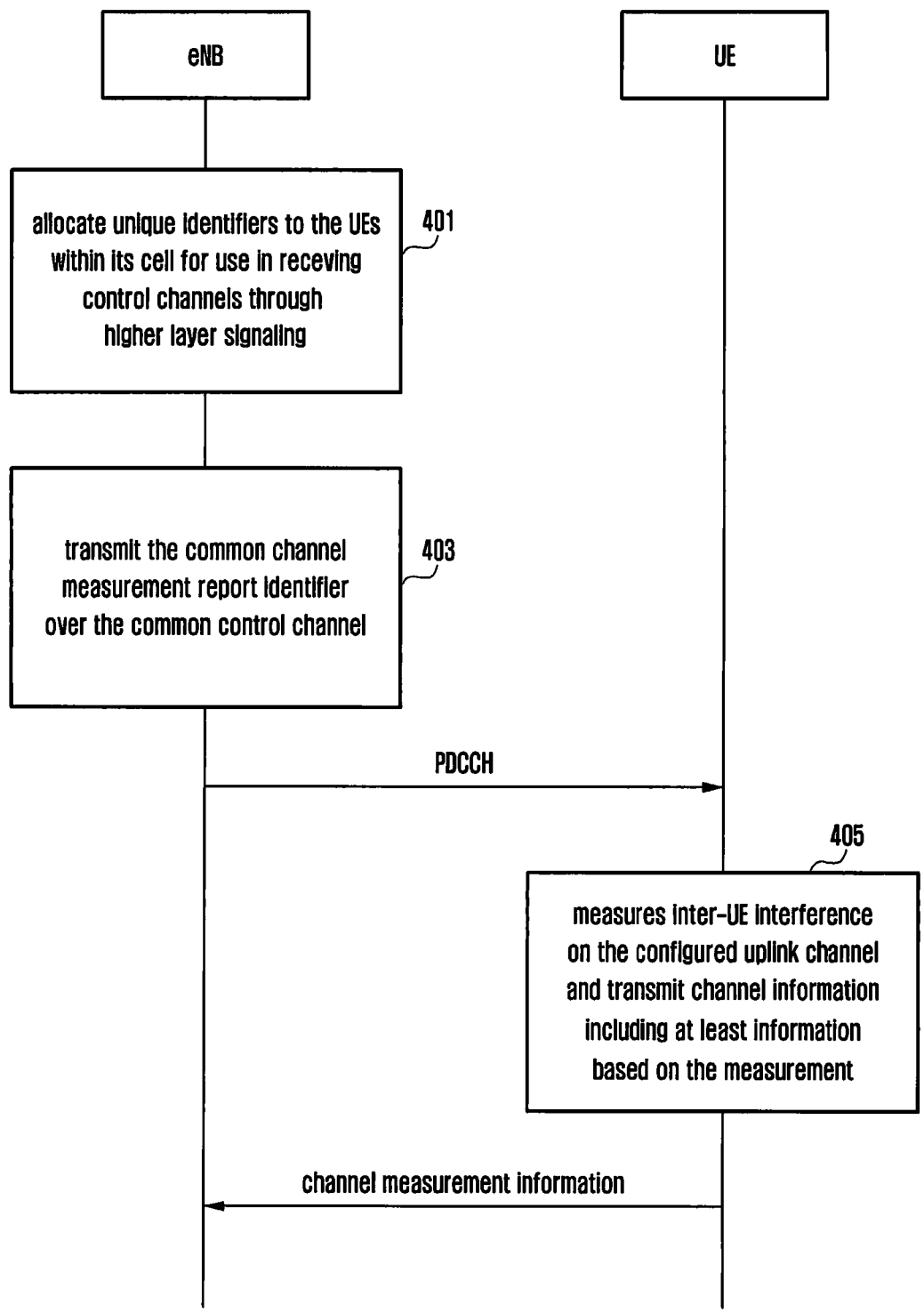
FIG. 4 is a signal flow diagram illustrating a signal measurement feedback method according to an embodiment of the present invention.

FIG. 4 is a signal flow diagram illustrating a signal measurement feedback method according to an embodiment of the present invention. "Signal measurement" indicates that a channel signal and/or an interference signal is being measured.

Referring to FIG. 4, the eNB allocates unique identifiers to all the UEs within its cell for use in receiving control channels through higher layer signaling in step 401. The eNB also allocates a common identifier, i.e., a UE group identifier (also called and/or comprising one or more of a common channel measurement report identifier, a common channel measurement identifier, a common identifier, and a CSI-RNTI), to a group of the UEs located within the cell so that the eNB can simultaneously request and simultaneously receive signal measurement feedback from that UE group. The eNB also transmits a CSI-RS for channel measurement and/or a CSI-IM for interference measurement to all the UEs within the cell.

The eNB transmits the common channel measurement report identifier over the common control channel in step 403. When the eNB transmits the common channel measurement report identifier, the UEs to which the common channel measurement report identifier was allocated can receive the control information simultaneously.

In this way, the eNB can have simultaneous channel measurement feedback, by allocating a common channel measurement report identifier to a group of UEs, some or all of which will respond when the common channel measurement identifier is transmitted.

By receiving the common channel measurement identifier, the UEs from which the eNB wants channel information feedback are the only UEs instructed from among all the UEs receiving the signal, to measure inter-UE interference on the uplink channel and to transmit channel information including at least information based on the measurement in step 405. At this time, the UE performing channel information feedback is the UE allocated the common channel measurement report identifier, i.e. the UE received the control information including the feedback command with the common channel measurement report. The eNB allocates the common channel measurement report identifier to the UEs from which it wants to receive channel measurement feedback so as to be able to receive the group-selective channel measurement feedback.

As described in the paragraphs above and shown in FIG. 4, the eNB can configure control information so that multiple UEs are instructed to measure MU-MIMO transmission channels and to report their channel measurement results simultaneously so that the eNB may perform more accurate and more efficient MU-MIMO transmission channel estimation.

How to configure the control information according to embodiments of the present information is described in detail below.

Figure 5:
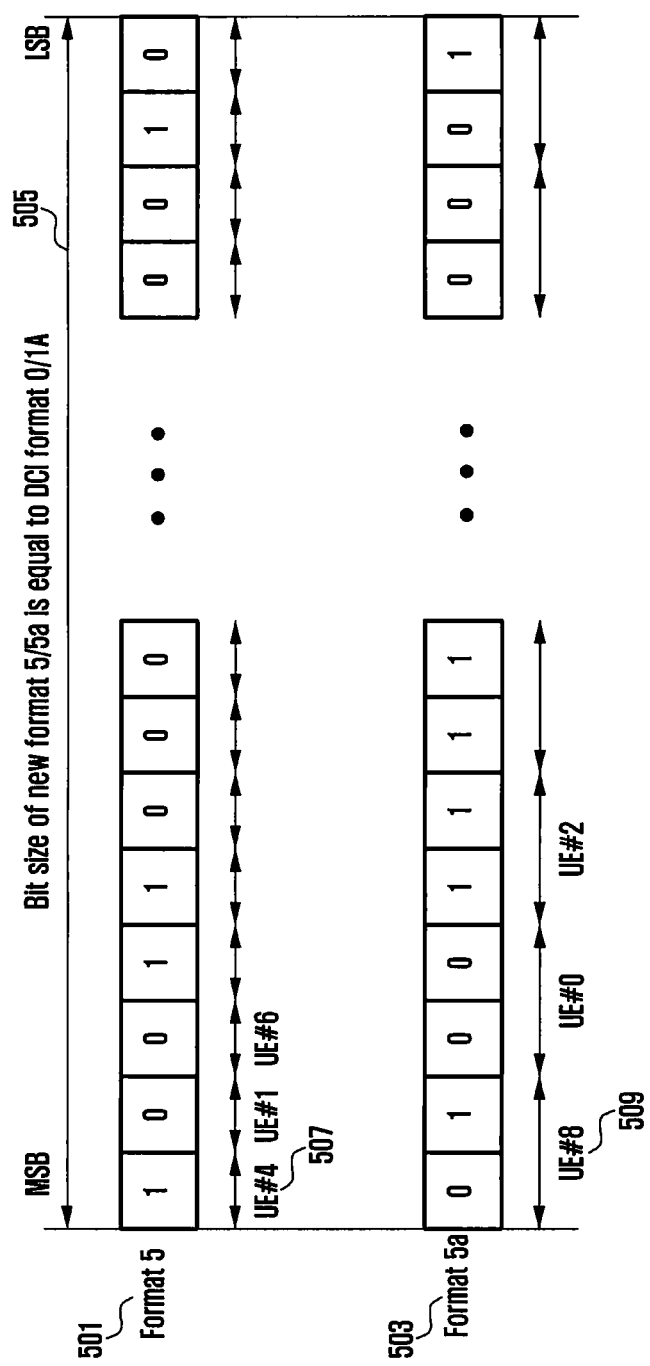
FIG. 5 is a diagram illustrating control information configurations according to an embodiment of the present invention.

FIG. 5 is a diagram illustrating control information configurations according to an embodiment of the present invention. The control information in FIG. 5 is configured for a eNB to inform each UE in a group of UEs whether to perform and provide signal measurement feedback.

According to this embodiment of the present invention, the control information for the group of UEs is generated by concatenating the terminal-specific control information of each of the plurality of UEs in the group by means of which the eNB can instruct each UE in the group whether to perform signal measurement feedback. Information concerning the arrangement or order (i.e., the position) of UE-specific control information may be transmitted to a UE through higher layer signaling, predetermined by rule, and/or prestored in each terminal.

The eNB maps the control information to a common control channel region so that the plurality of UEs in the group receives the control information simultaneously. The eNB configures the size of the control information (new DCI format 5/5a) to be equal to other control information (i.e., legacy DCI format 0/1a) in order for the UE not to perform receipt of the control channel redundantly. The eNB scrambles the CRC of the control information (control signal) with the common channel measurement identifier.

In FIG. 5, control information 501 is formatted by mapping every bit of the control information (signal) to a corresponding UE, and control information 503 is formatted by mapping every two bits of the control information to a corresponding UE. Accordingly, reference numeral 507 indicates that the terminal-specific control information for UE #4 in control information 501 has a single bit value of 1, while reference numeral 509 indicates that the terminal-specific control information for UE #8 in control information 503 has a two bit value of 01.

When using 1 bit for each UE as shown in control information 501, the bit may be interpreted as follows: 0 indicates no signal measurement feedback while 1 indicates signal measurement feedback for the corresponding UE. This control information may be transmitted from the eNB to the UEs through higher layer signaling. The eNB may use this 0/1 interpretation when using either SU-MIMO or MU-MIMO. These methods are used for the eNB to acquire the intended feedback information and, since the MU-MIMO transmission is affected by the UE's channel condition and eNB's characteristics. The eNB can freely determine which transmission mode to use, either SU-MIMO or MU-MIMO.

Alternatively to channel signals, the bit values may indicate signal measurement feedback for MU-MIMO interference preconfigured by the eNB. Interference information is transmitted to the UE via higher layer signaling. The channel information feedback for MU-MIMO interference preconfigured by the eNB is generated by combining the interferences measured on the respective resources using the interference measurement resources allocated to the UEs. This method is discussed below. This method is advantageous in that the eNB controls the UE to use part of the interference measurement resource or only a specific resource to measure interference and transmit the measured interference.

As another alternative, 0 may indicate signal measurement of a configured interference measurement resource and 1 may indicate release of the configured interference measurement resource, or vice-versa. This method allocates additional resources in order for the UE to measure instantaneous multiuser (MU) interference. Since the eNB uses the resource only at the time point when the interference measurement is required, it is possible to improve the resource utilization efficiency and to adjust the time period for interference measurement on the interference measurement resource.

When using 2 bits for each UE as shown in control information 503, the two bits may be interpreted as follows: 00 indicates no channel measurement feedback, 01 indicates interference measurement using a first interference measurement resource, 10 indicates interference measurement using a second interference measurement resource, and 11 indicates the sum of interferences measured using both the first and second interference resources. In another embodiment, 00 indicates no interference measurement, 01 indicates the initiation of interference measurement, 10 indicates the release (or cessation/stopping) of interference measurement, and 11 indicates the refreshment (or restart/reinitiating) of interference measurement. In other embodiments of the present invention, the particular set of bits may indicate any possible variation for measuring channel(s) and/or interference(s), including the measuring of any inter-UE interferences and/or combination of inter-UE interferences. One advantage of these embodiments is that the eNB can instruct the UE to perform signal measurement in various ways and thereby acquire various types of signal measurements. As previously stated, the control information bearing the two bits may be transmitted from the eNB to the UE through higher layer signaling.

The eNB may notify each UE of its own control information configuration information (i.e. information necessary for the UE to locate its terminal-specific control information) through higher layer signaling. Depending on the embodiment, the eNB may notify the UE of information on the position (order) of the UE-specific information (i.e. the order of the terminal-specific information for respective UEs) and the size of each terminal-specific control information in the control information. In an embodiment of the present invention, the size of each UE-specific information is 1 bit or 2 bits.

The whole size of the control information of embodiments of the present invention may be determined to be equal to the size of the legacy control information in a different format transmitted on the common control channel as denoted by reference number 505. This is because if the sizes of the control information of the embodiments of the present invention are identical with the legacy control information it is possible for the UE to perform decoding under the assumption of the same size other than different sizes and then to analyze the information based on whether it passes the CRC check with the identifier it has. Since it is faster to perform CRC check on the control information identical in size than to use the decoder several times for the control information different in size when decoding the control information, it is possible, if the control information are identical in size with each other, for the UE to reduce the load of decoding the control signals.

Once the control information (control channel) is configured, the eNB maps the control information to the control channel region for transmission. At this time, the eNB maps the control information to the common control channel region such that all of the UEs receive the control information simultaneously.

In an embodiment of the present invention, the eNB allocates a common or group identifier (such as, e.g., one, some, or all of a common channel measurement report identifier, a common channel measurement identifier, a common channel measurement indication identifier, or a CSI-RNTI) to a group of UEs among all of the UEs in the cell and transmits the control information configured as above using the commonly allocated identifier. The eNB can configure a plurality of groups, each with a different common identifier.

When the control signal is transmitted on an Enhanced PDCCH (E-PDCCH) rather than a conventional PDCCH, the eNB may allocate the resource for E-PDCCH to the plural UEs. Each UE searches for the control channel with the common identifier channel information feedback (CSI-RNTI) in the UE-specific control channel region. In the case that the resource region for E-PDCCH is small, the UE-specific search spaces are overlapped such that even though the eNB maps the common control channel to the UE-specific control channel region the plural UEs can receive the control information simultaneously. If the eNB configures the common search space with a common identifier for channel information feedback in the E-PDCCH resource region and transmits the control channel on the corresponding region, the UE can receive the corresponding control channel through additional control channel decoding.

In some embodiments of the present invention, the eNB commands a plurality of selected UEs to simultaneously measure interferences and then report their respective interference measurement results simultaneously through a common control channel.

Figure 6:
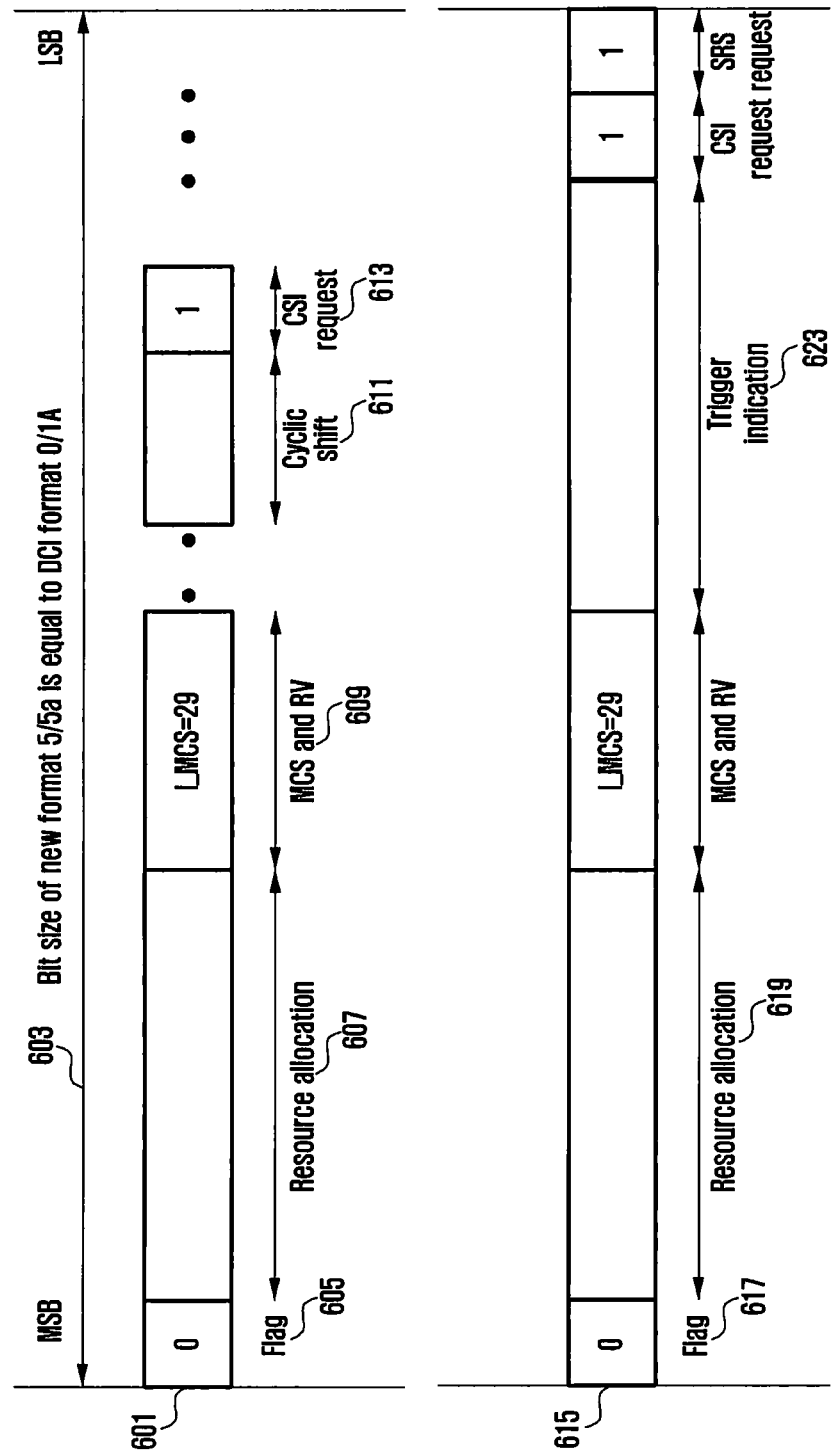
FIG. 6 is a diagram illustrating control information configurations according to another embodiment of the present invention.

FIG. 6 is a diagram illustrating control information configurations according to another embodiment of the present invention for indicating signal measurement feedback. According to this embodiment of the present invention, the control information for the group-selective channel feedback method in the wireless communication system includes uplink scheduling control information of the uplink channel for feedback of signal measurement information on an uplink data channel resource without data.

The eNB allocates a common control channel region in order for a plurality of UEs to receive the control information simultaneously and configures the control information to be identical in size with other control information to avoid the need to transmit (or the UE to receive) extra control information. The eNB also scrambles the CRC for the control information (signal) with a common channel measurement identifier.

The eNB may allocate UE-specific feedback channel regions in configuring the control information and notify the UEs of their respective UE-specific feedback channel regions in advance. Alternatively, the eNB may transmit information in the control signal for use by the UEs in receiving their respective UE-specific feedback indication signals.

In an embodiment of the present invention, the eNB configures the control information including the UE-specific channel information feedback indicators and transmits the control information.

As shown in the top part of FIG. 6, the eNB instructs the UE to perform and report signal measurements through control channel 601 for scheduling uplink data channel transmission. For this purpose, the eNB sets field or flag 605 to 0 to indicate that the corresponding control signal is the uplink control signal. The eNB sets resource allocation field 607 to indicate that the resource allocation level for data channel transmission is a value less than 4 Physical Resource Blocks (PRBs). The eNB also sets the Modulation and Coding Scheme (MCS) and Redundancy Version (RV) field 609 to indicate that I_MCS=29 and sets CSI Request field 613 to 1 to indicate signal measurement feedback. The eNB scrambles the CRC of the control signal with the unique identifier of the UE (such as, e.g., RNTI) and transmits the scrambled signal on the UE-specific control region. In order to transmit the control signal on the common control channel, the eNB scrambles the CRC with a common or group identifier (such as, e.g., the common channel measurement indication identifier) and maps the scrambled control signal to the common control channel region. Control channel 601 according to this embodiment of the present invention maintains the legacy structure for control channel information.

In embodiments of the present invention using resource allocation field 607 of the common control channel to provide extra UE-specific resource allocation information, a method is needed for notifying an individual UE of its UE-specific resource allocation region.

One approach for notifying individual UEs of their UE-specific resource allocation regions is for the eNB to inform the UEs through higher layer signaling. Using the higher layer signaling to transmit an index for UE-specific signal measurement instruction, such as the one shown in FIG. 5, the UE-specific region within resource allocation field 607 may be identified by a UE using the index. When such an index is transmitted via higher layer signaling, the number of UEs that can be indicated in the control channel is less than can be indicated in the embodiment in FIG. 5, but the eNB can receive the signal measurement feedback through the data channel.

The lower part of FIG. 6 shows another approach for notifying the UEs of their UE-specific resource allocation regions. In this approach, the eNB uses control channel format 615 for all the UEs, and each individual UE recognizes the control channel addressed to it based on Trigger indication field 623. The eNB notifies each UE of the position of Trigger indication field 623 through higher layer signaling. In this case, the eNB notifies the UE of a cyclic shift value for use in transmitting the signal measurement feedback through higher layer signaling, and each UE transmits to the eNB the measurement feedback of the resources indicated in resource allocation field 619 using a different cyclic shift value. This method is advantageous in terms of avoiding interference between the measurement feedback signals transmitted by the UEs. In this case, since the eNB receives the channel measurement feedback through MU-MIMO, it is possible to save feedback channel resources as well as channel measurement indication resources.

Figure 7:
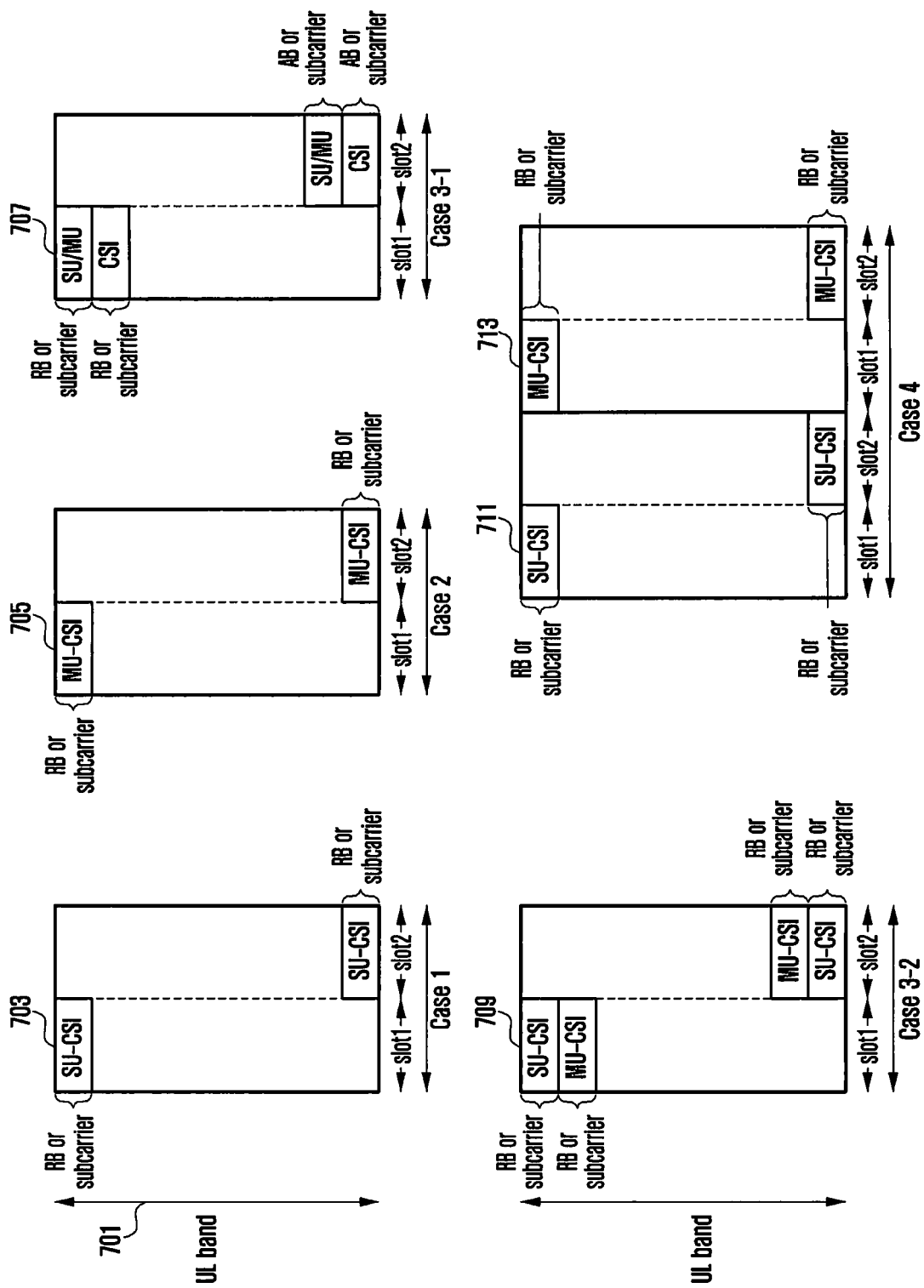
FIG. 7 is a diagram illustrating signal measurement feedback transmitted on an uplink control channel according to an embodiment of the present invention.

FIG. 7 is a diagram illustrating signal measurement feedback transmitted on an uplink control channel, in this case, the Physical Uplink Control Channel (PUCCH), according to an embodiment of the present invention.

In this embodiment of the present invention, the UE transmits signal measurement feedback selectively on a channel resource using the uplink control channel format 3 (PUCCH format 3) according to the indication in the control channel information transmitted by the eNB. Here, the signal measurement feedback comprises SU-MIMO channel measurement information or Single User Channel State Information (SU-CSI) and MU-MIMO channel measurement information or Multiple User Channel State Information (MU-CSI).

In Case 1 and Case 2 of FIG. 7, the eNB has previously notified the UE through higher layer signaling which uplink transmission PUCCH format 3 resources to use to transmit signal measurement information, and those resources are denoted by reference numbers 703 and 705. More specifically, the UE transmits SU-MIMO channel measurement information, in this case, Single User Channel State Information (SU-CSI), by resource 703 in one channel resource (Case 1) and MU-MIMO channel measurement information, in this case, Multiple User Channel State Information (MU-CSI), by resource 705 in another channel resource (Case 2), based on the channel measurement information sent by the eNB.

Channel coding is performed on signal measurement information SU-CSI and MU-CSI using the uplink channel format 3 (PUCCH format 3) according to the indication in the control channel information sent by the eNB and then, as shown in Cases 1 and 2 in FIG. 7, the channel-coded information SU-CSI and MU-CSI are transmitted in two consecutive channel resources on the frequencies preconfigured for the respective UEs by the eNB through higher layer signaling.

In Cases 3-1 and 3-2 of FIG. 7, the SU-CSI and MU-CSI are concatenated and transmitted in consecutive time resources 707 (Case 3-1) or consecutive frequency resources 709 (Case 3-2), respectively, within the same channel resource.

In Case 3-1 of FIG. 7, the channel measurement feedback indicator received from the eNB through higher layer signaling has instructed the UE to configure and map the SU-CSI and MU-CSI to consecutive PUCCH format 3 time resources for transmission. For this purpose, the UE configures the SU-CSI and the MU-CSI independently, concatenates the independently configured information, performs channel coding using uplink control channel format 3 (PUCCH format 3) on the concatenated information, and transmits the concatenated SU-CSI/MU-CSI to the eNB on consecutive time resources 707. This improves the reception performance of the eNB, especially when the UE has a small amount of information to transmit. When the amounts of the first and second channel measurement information vary, the smaller the information amount to be transmitted is, the higher the reception performance is on the same resource.

In Case 3-2 of FIG. 7, the channel measurement feedback indicator received from the eNB has instructed the UE to configure and map the SU-CSI and MU-CSI to consecutive PUCCH format 3 frequency resources. For this purpose, the UE configures the SU-CSI and MU-CSI and performs channel coding such that the SU-CSI and MU-CSI are on different, but consecutive, PUCCH format 3 frequency resources 709. This increases the probability that the eNB will receive at least one channel information even when a channel reception error occurs, because the channel measurement information is transmitted separately (i.e., on different frequency carriers). Since the UE transmits the PUCCH format 3 on the consecutive frequencies, it is possible to maintain continuous resource allocation and thus save transmit power.

In Case 4 of FIG. 7, the SU-CSI and MU-CSI are transmitted in different, but consecutive (in time), channel resources.

In Case 4 of FIG. 7, the channel measurement feedback indicator received from the eNB instructs the UE to configure and map the SU-CSI and MU-CSI to resources 711 and 713, respectively, which are in two separate but contiguous (in time) PUCCH format 3 channel resources, for transmission. This is for transmitting the information using the resources different on the time axis at higher transmit powers since if the UE transmits two different PUCCH format 3s simultaneously this may degrade the reception performance of the eNB.

Figure 8:
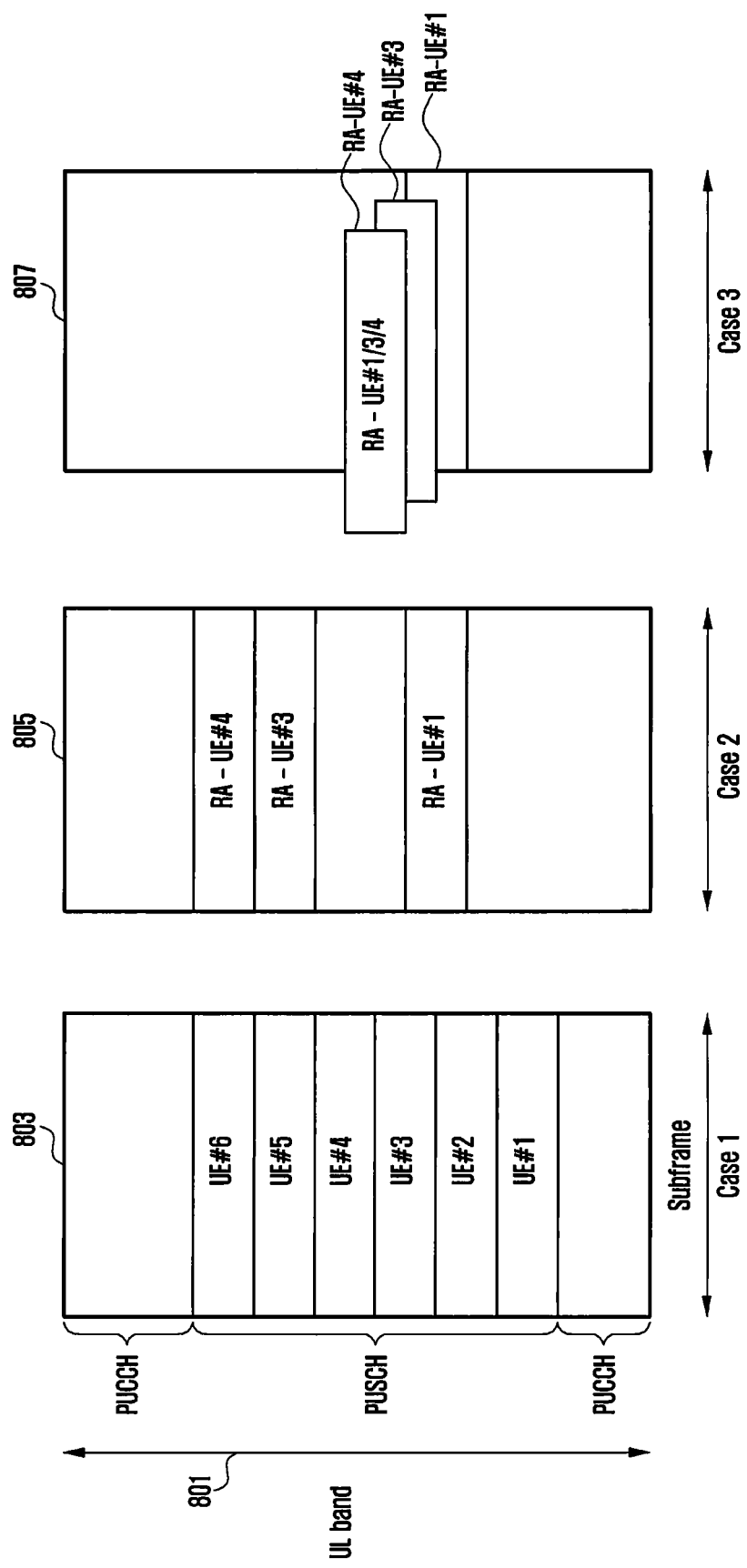
FIG. 8 is a diagram illustrating signal measurement feedback transmitted on an uplink data channel according to an embodiment of the present invention.

FIG. 8 is a diagram illustrating signal measurement feedback transmitted on an uplink data channel, in this case, the Physical Uplink Shared Channel (PUSCH), according to an embodiment of the present invention.

In this embodiment, each of the UEs transmits signal measurement feedback simultaneously on the uplink data channel (data-less PUSCH, i.e., a PUSCH that is not carrying data) at the resource position indicated by the control channel information previously sent by the eNB.

In Case 1 of FIG. 8, eNB has notified each (or a subset) of UE #1, UE #2, UE #3, UE #4, UE #5, and UE #6 of the uplink data channel resource 803 to use for transmitting signal measurement feedback in advance through higher layer signaling. Based on the position indicated by a channel information indicator sent by the eNB, the UEs transmit the measurement information on uplink data channel resource 803. The individual resource regions for each UE within channel resource 803 are the preset reference positions, and thus the eNB need only indicate channel resource 803 without identifying specific resource regions for each UE. This method is advantageous in that individual UEs need not be informed of their respective specific resource regions within channel resource 803, but disadvantageous in terms of restricting data channel scheduling of other UEs and limiting the eNB's ability to dynamically allocate uplink resources for transmitting measurement results.

In Case 2 of FIG. 8, the eNB has informed each of UE #1, UE #3, and UE #4 of its respective inter-UE resource offset through higher layer signaling. Using the common resource allocation information with the channel information indicator transmitted through the higher layer signaling by the eNB, each UE transmits its measurement feedback on the subcarrier indicated by its own respective resource offset within channel resource 805. This method of commanding UEs to perform and then transmit channel measurements simultaneously is capable of reducing the restriction of data channel scheduling for other UEs as well as providing the UEs with the resource allocation information relatively dynamically.

Figure 9:
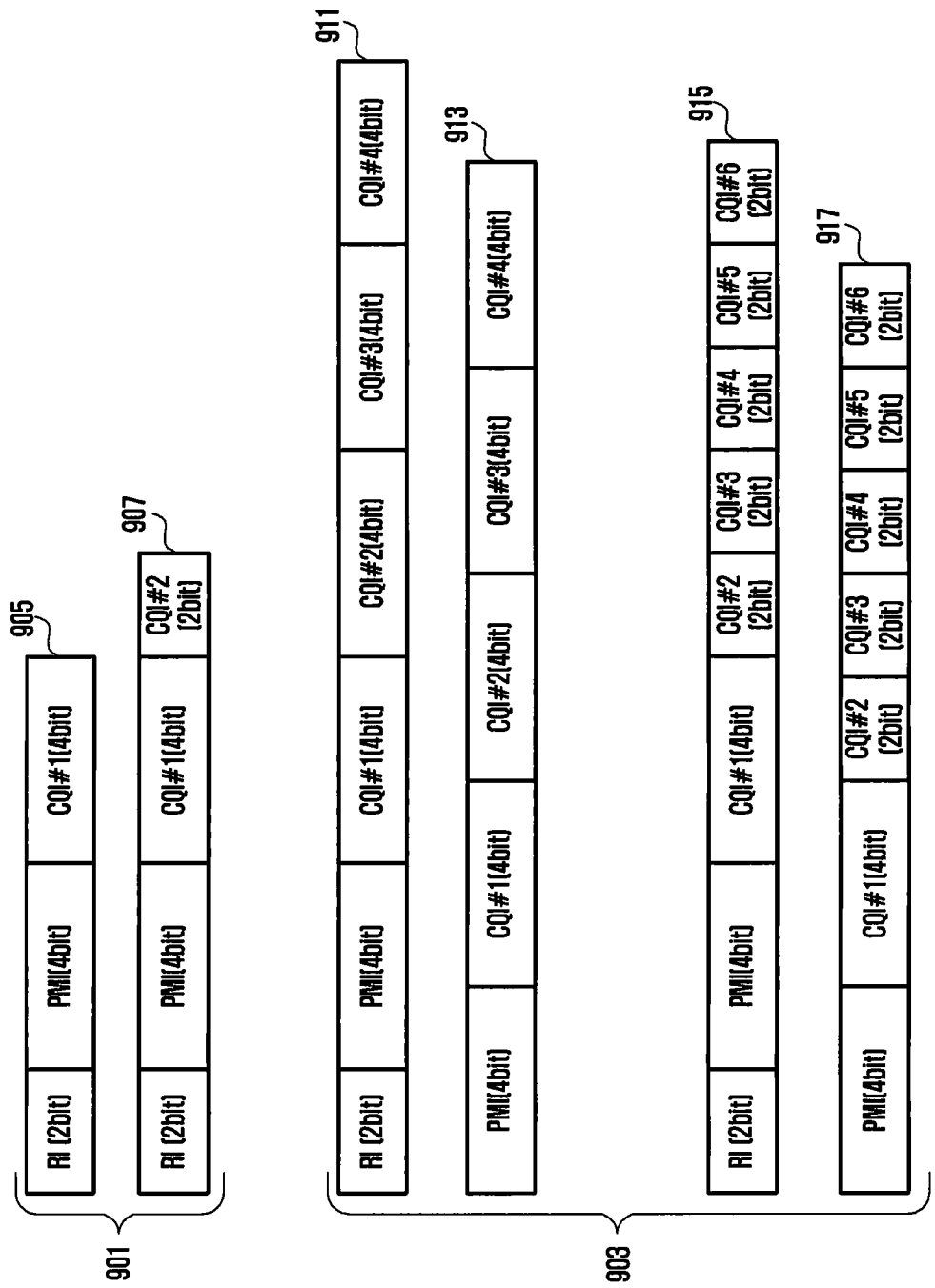
FIG. 9 is a diagram illustrating signal measurement feedback configurations according to an embodiment of the present invention.

In Case 3 of FIG. 8, the eNB has informed, through higher layer signaling, each of UE #1, UE #3, and UE #4 of its respective cyclic shift value to be used for transmitting its measurement feedback on uplink data channel resource 807. Using the common resource allocation information received with the channel information indicator through higher layer signaling from the eNB, each UE transmits measurement feedback on the same frequency resource (subcarrier) by each applying its own cyclic shift value as indicated by the eNB. By this method of instructing all the UEs to perform and then transmit channel measurements simultaneously, the eNB is capable of providing the UEs with the resource allocation information dynamically and receiving feedback in uplink simultaneously through MU-MIMO so as to save resources. The eNB is also capable of estimating inter-UE interference on the uplink data channel. FIG. 9 is a diagram illustrating signal measurement feedback configurations according to an embodiment of the present invention.

Measurement channel feedback may include at least one Rank Indicator (RI), at least one Precoder Matrix Indicator (PMI), at least one Single User-Channel Quality Indicator (SU-CQI), and at least one Multiuser-CQI (MU-CQI). Here, MU-CQI includes a CQI offset in consideration of at least one MU hypothesis.

Reference numeral 901 in FIG. 9 indicates the conventional configuration of signal measurement feedback. The signal measurement feedback information denoted by 901 is configured under the assumption of SU-MIMO and includes RI, PMI, and CQI that are transmitted in sequence simultaneously or discretely. For feedback information 905, the RI is 1, and thus the CQI is transmitted as one codeword. For feedback information 907, the RI is 2, and thus two CQIs are transmitted: CQI #1 with 4 bits and CQI #2 having only two bits, because CQI #2 is transmitted as a subband differential CSI with an offset from the information in CQI #1. Both are determined under the assumption of the PMI for SU-MIMO. When the RI is higher than two, additional offset CQIs are added accordingly.

Reference numeral 903 in FIG. 9 indicates configurations of signal measurement feedback according to an embodiment of the present invention.

Reference number 911 denotes a signal measurement feedback configuration having RI, PMI, CQI #1, CQI #2, CQI #3, and CQI #4. Under SU-MIMO, the UE transmits, if the RI is 1, only CQI #1; and, if the RI is 2, CQI #1 and CQI #2—generally, the RI corresponds to the number of CQI transmitted. Under MU-MIMO, the UE may transmit extra CQI. For example, when the RI is 1, CQI #2, CQI #3, and CQI #4 can also be transmitted, each corresponding to an interference source or combination of interference sources and, when the RI is 2, CQI #3 and CQI #4 can also be transmitted to inform the eNB of measurements of interference from one or more interference sources. CQI #3 and CQI #4 as CQI values for respective codewords for 1 extra interference in the case of the RI of 2.

Reference number 913 denotes a signal measurement feedback configuration without an RI field. Channel measurement feedback configuration 913 is used when the RI is always 1. Under SU-MIMO, the UE transmits PMI and CQI #1, but can also transmit, in addition, CQI #2, CQI #3, and CQI #4 for interference caused by one or more interference sources.

Reference number 915 denotes a signal measurement feedback configuration having RI, PMI, CQI #1, CQI #2, CQI #3, CQI #4, CQI #5, and CQI #6. Under SU-MIMO, the UE transmits, if the RI is 1, only the CQI #1 and, if the RI is 2. the CQI #1 and CQI #2—generally, the RI corresponds to the number of CQI. Under MU-MIMO, when RI is 1, the UE can transmit one or more of CQI #2, CQI #3, CQI #4, CQI #5, and CQI #6 for up to 5 extra interference sources or combinations of interference sources. When RI is 2, the UE can transmit one or more of CQI #3, CQI #4, CQI #5, and CQI #6 for up to 4 extra interference sources or combinations of interference sources, and so on. As discussed above in reference to configuration 907, CQI #2, CQI #3, CQI #4, CQI #5, and CQI #6 are transmitted as subband differential CSIs and thus require only 2 bits each. CQI #3 and CQI #4 as the CQI values for respective codewords for two extra interferences and CQI #5 and CQI #6 in the case of the RI of 2. Reference number 917 denotes a signal measurement feedback configuration without an RI field. Channel measurement feedback configuration 917 is used when the RI is always 1. Under SU-MIMO, the UE transmits PMI and CQI #1 and, in addition, can also transmit CQI #2, CQI #4, CQI #5, and CQI #6 for up to five interference sources and/or various combinations of interference sources.

In later releases of the Long Term Evolution (LTE) standards from the 3$^{rd}$ Generation Partnership Project (3GPP), the base station, e.g., eNB, may determine interference measurement resources (IMRs) which correspond to actual interfering signals. The signal measurement feedback resulting from such IMRs could be sent back in accordance with embodiments of the present invention. For example, using channel measurement feedback configuration 917, if there are three interference measurement resources IMR 1, IMR 2, and IMR 3, CQI #1 could correspond to only IMR 1, CQI #2 could correspond to only IMR 2, CQI #3 could correspond to only IMR 3, CQI #4 could correspond to the combination of IMR 1 and IMR 2, CQI #5 to the combination of IMR 2 and IMR 3, and CQI #6 to all of IMR 1, IMR 2, and IMR 3.

Figure 10:
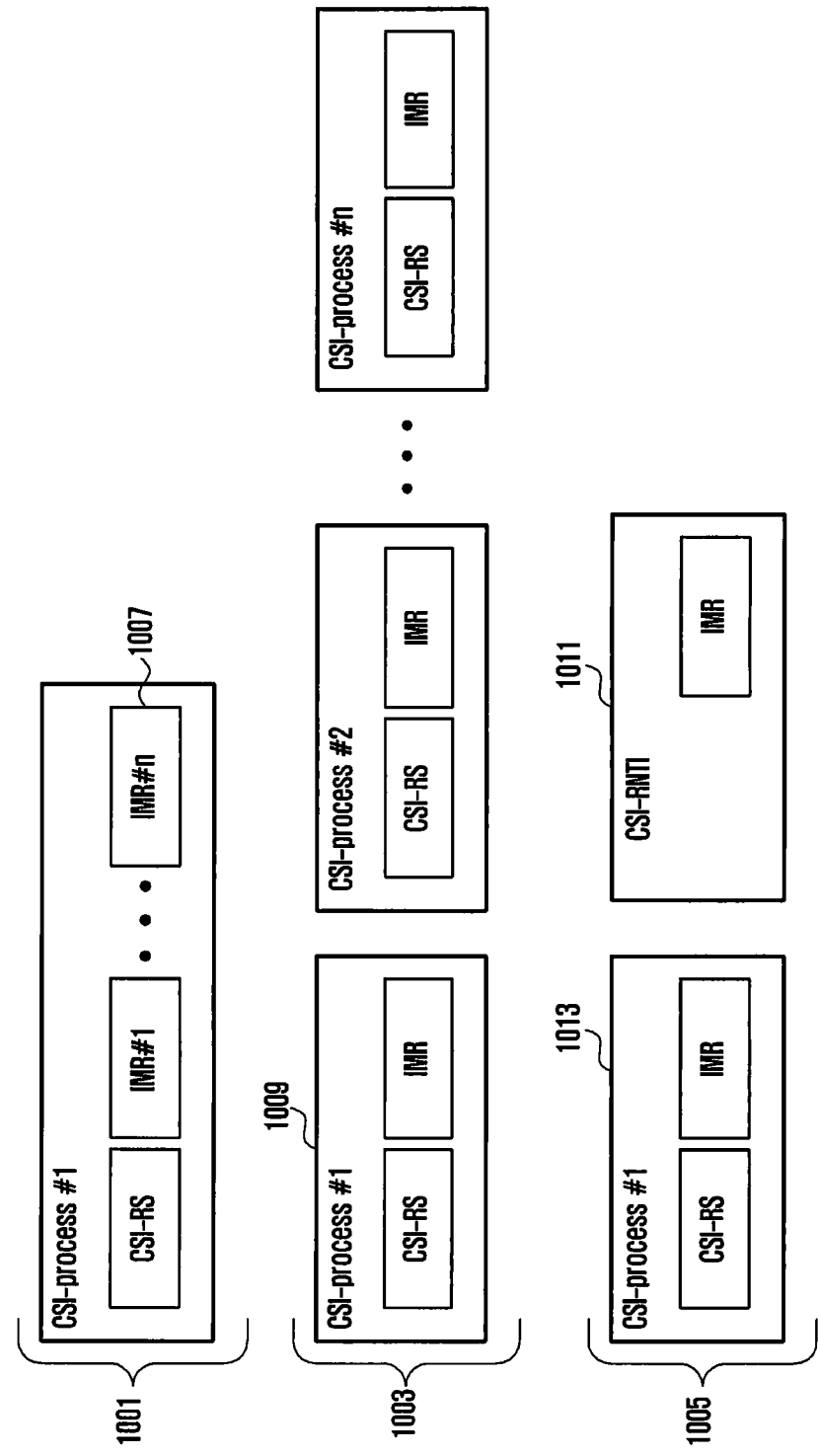
FIG. 10 is a diagram illustrating configurations of signal measurement processes according to an embodiment of the present invention.

FIG. 10 is a diagram illustrating different configurations of signal measurement processes according to an embodiment of the present invention.

In FIG. 10, the eNB configures at least one signal/channel measurement process (CSI-process) corresponding to the UE measuring at least one channel and a plurality of interference measurement resources (IMRs). The eNB controls the UE to measure inter-UE interference using one or more interference measurement resources (IMRs) that are determined by the eNB and transmitted through high layer signaling to the UE or are determined according to one or more predetermined rules.

In configuration 1001 of FIG. 10, the UE has one CSI-process. For this CSI-process, the eNB has configured one CSI-RS for one channel measurement process and a plurality of IMRs for the UE to take MU-MIMO interference measurements, the last of which is denoted by reference number 1007. The eNB informs the UE of the combinations of IMRs to use in generating CQI for signal measurement feedback.

In configuration 1003 of FIG. 10, the eNB has configured a plurality of CSI-processes for the UE, where each CSI-process comprises one channel measurement resource and one interference measurement resource corresponding to the channel measurement resource. The eNB controls the UE to measure interference using these combinations of channel measurement resources and corresponding interference measurement resources. In configuration 1003, the UE has a plurality of signal measurement processes (CSI-Processes #1, #2, . . . , # n) configured by the eNB for signal measurement. As shown by CSI-process #1 1009, the eNB allocates, for each of the plurality of signal measurement processes for MU-MIMO interference measurement, one CSI-RS and one IMR. The eNB informs the UE of the CSI-RSs and the combinations of the IMRs to use in generating CQI for channel measurement feedback.

In configuration 1005 of FIG. 5, the eNB has configured additional interference measurement resource corresponding to a channel measurement identifier through higher layer signal in separation of the preconfigured channel measurement and interference measurement resources such that the UE measurement interference using the corresponding interference measurement resource. In configuration 1005 of FIG. 10, the UE has at least one channel measurement process (CSI-Process) for channel and interference measurements, for each of which the eNB has configured one CSI-RS and one corresponding IMR, as shown by CSI-process #1 1013. In addition, the eNB has allocated an extra process 1011, in which an IMR is linked to a channel measurement identifier (i.e., CSI-RNTI, Channel State Information-Random Network Temporary Identifier). Process 1011 can be used for instantaneous MU-MIMO interference measurement by the UE. The eNB informs the UE of process 1011 in advance.

Figure 11:
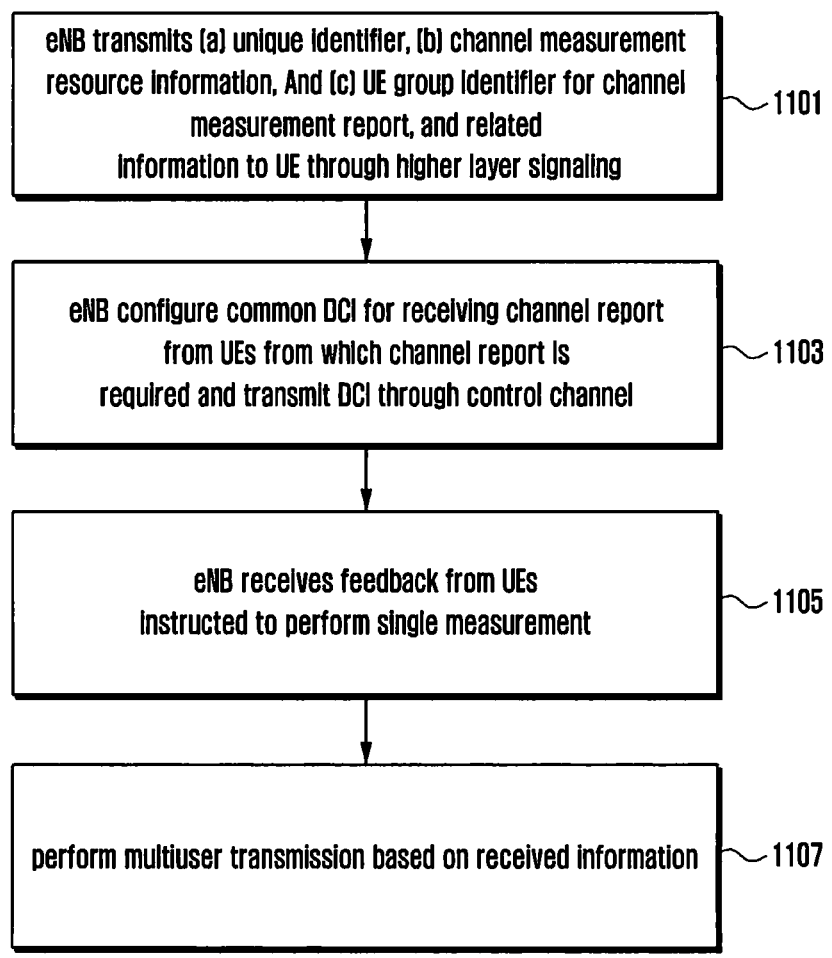
FIG. 11 is a flowchart of a method for an eNB to configure and then receive signal measurement feedback according to an embodiment of the present invention.

FIG. 11 is a flowchart of a method for an eNB to configure and then receive signal measurement feedback according to an embodiment of the present invention.

In step 1101, the eNB transmits, through higher layer signaling, (a) a unique identifier allocated by the eNB to at least one UE; (b) channel measurement resource information; (c) a UE group identifier for the UEs making the channel measurement report. Other information is also transmitted, as is well known by one of ordinary skill in the art, and will not be described here.

In step 1103, the eNB configures common control channel information to the UEs of which channel measurement report is required in order for the UEs to receive channel measurement command and maps the common control information to the common control region for transmission. At this time, the eNB may control the UE to receive the corresponding control channel using the channel measurement identifier.

In step 1105, the eNB receives feedback carrying the signal measurement report(s) from the UEs instructed to perform signal measurement in step 1103.

Finally, in step 1107, the eNB processes the received channel measurement information and performs MU-MIMO transmission based on the information received in step 1105.

Figure 12:
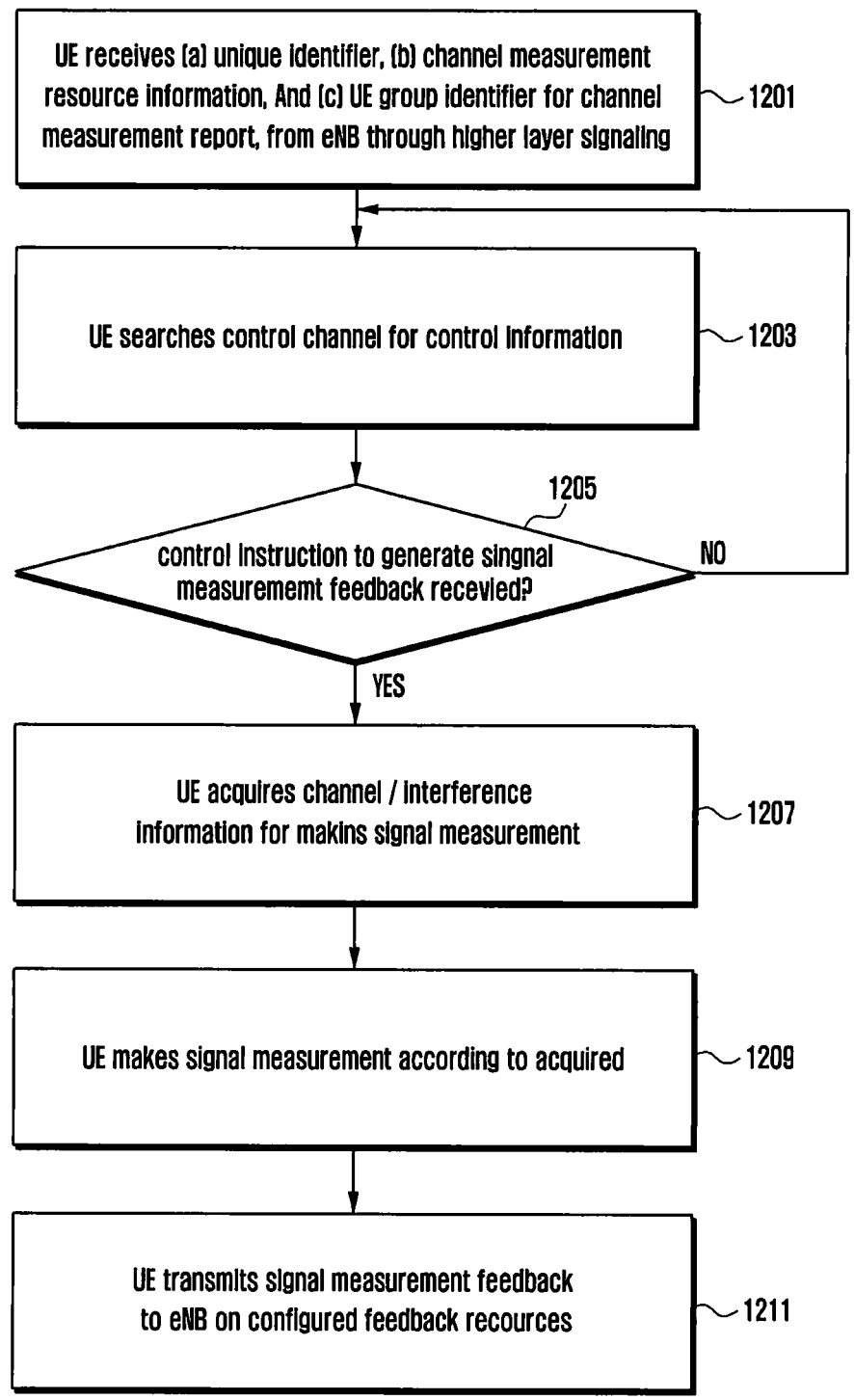
FIG. 12 is a flowchart of a method for a UE to receive signal measurement instructions from, and send signal measurement feedback to, and eNB according to an embodiment of the present invention.

FIG. 12 is a flowchart of a method for a UE to receive signal measurement instructions from, and provide signal measurement feedback to, an eNB according to an embodiment of the present invention.

In step 1201, the UE receives, through higher layer signaling, (a) a unique identifier allocated by the eNB; (b) channel measurement resource information; and (c) UE group identifier for a channel measurement report. Other information is also transmitted, as is well known by one of ordinary skill in the art, and will not be described here.

In step 1203, the UE searches the control channel for control information and, in step 1205, determines if control information instructing the UE to generate a channel measurement report is received. If it is determined that no such instruction is received in step 1205, the UE returns to step 1203 to continue searching the control channel. If such an instruction is received in step 1205, the UE acquires the channel information and interference information for the configured channel measurement(s) in step 1207. In some embodiments, the UE may have already stored the channel information and interference information in a memory and, in such embodiments, acquiring the information in step 1207 may comprise a procedure for processing the information stored in the memory of the UE.

Next, in step 1209, the UE makes channel and/or interference measurements as indicated at least by the acquired information from step 1207. Finally, in step 1211, the UE transmits the measurement feedback to the eNB on the appropriate feedback resources. As discussed in reference to step 1107 in FIG. 11, the eNB receives and uses the feedback information for, e.g., modifying transmission parameters.

Figure 13:
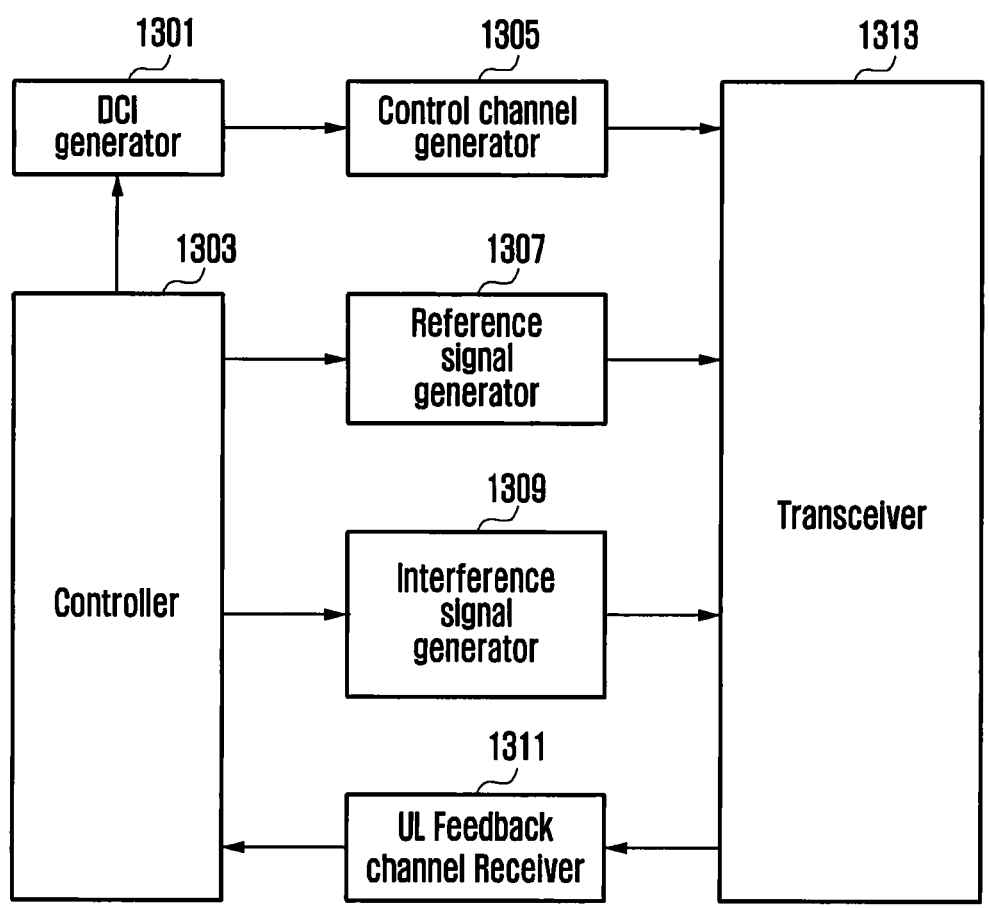
FIG. 13 is a block diagram of an eNB according to an embodiment of the present invention.

FIG. 13 is a block diagram of an eNB according to an embodiment of the present invention. As shown in FIG. 13, the eNB according to an embodiment of the present invention includes DCI generator 1301 for generating downlink control information, control channel generator 1305 for generating a control channel, RS generator 1307 for generating reference signals, interference signal generator 1309 for generating interference signals, and a controller 1303. The controller 1303 controls the DCI generator 1301 to generate the downlink control information and controls the control channel generator 1305 to generate the control channel.

The controller 1303 controls the RS generator 1307 to generate reference signals for use by the UEs in channel measurement and controls the interference signal generator 1309 to generate interference signals to assist inter-user interference measurement by the UEs. These signals are transmitted by transceiver 1313, which also receives the uplink signal carrying the feedback channel transmitted by the UE, which is received by UL feedback channel receiver 1311 and then transferred to the controller 1303.

The above description is directed to the components of the eNB and operations thereof. Although the descriptions are made of individual components and details for convenience of explanation, the scope of the present invention is not limited thereto. The eNB can perform any operations that may be required to implement any of the various embodiments of the present invention described with reference to FIGS. 1 to 12 as well as the operations described with reference to FIG. 13.

Figure 14:
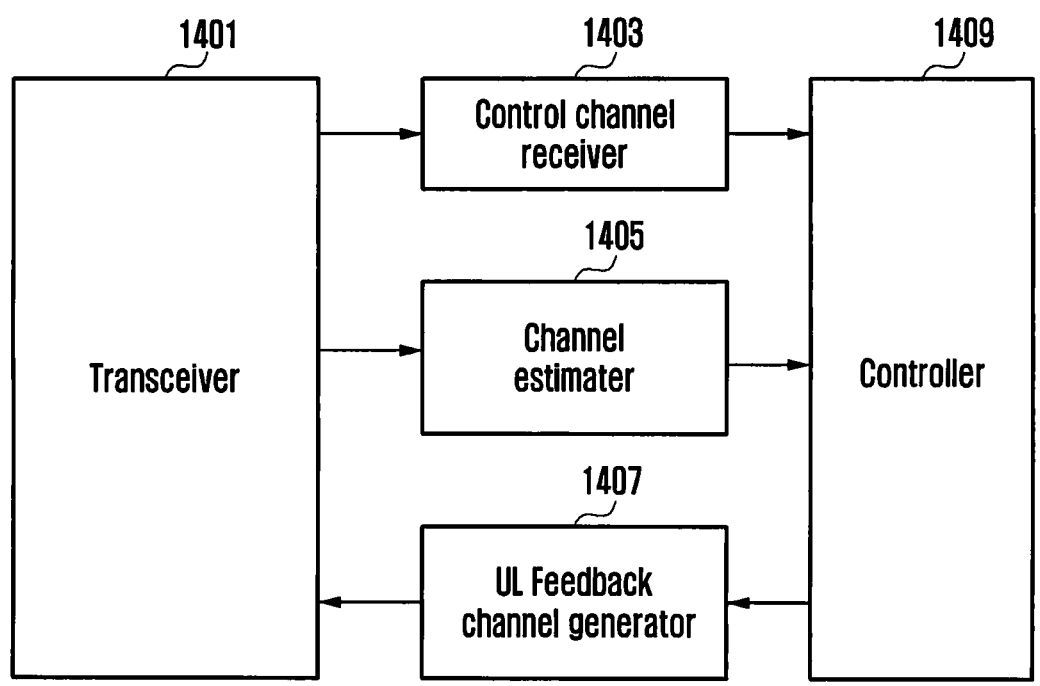
FIG. 14 is a block diagram of an UE according to an embodiment of the present invention.

FIG. 14 is a block diagram i of an UE according to an embodiment of the present invention.

As shown in FIG. 14, the UE according to an embodiment of the present invention includes channel estimator 1405 for performing channel measurement and interference measurement, control channel receiver 1403 for receiving a control channel from an eNB, a UL module 1407 for processing a feedback channel to be transmitted to the eNB, and a controller 1409 for controlling these and other components of the UE. The controller 1409 controls the control channel receiver 1403 to receive the control channel transmitted by the eNB and controls the channel estimator 1405 to acquire channel and interference measurement information. The controller 1409 configures feedback information based on the acquired measurement information and controls the UL feedback generator 1407 to generate the feedback channel, which is transmitted to the eNB by means of transceiver 1401.

The above description is directed to the components of the UE and operations thereof. Although the descriptions are made of individual components and details for convenience of explanation, the scope of the present invention is not limited thereto. The UE can perform any operations that may be required to implement any of the various embodiments of the present invention described with reference to FIGS. 1 to 12 as well as the operations described with reference to FIG. 14.

As described above, the selective channel feedback method according to embodiments of the present invention is advantageous in terms of transmitting a channel for selective channel feedback in a wireless communication system.

Also, the selective channel feedback method according to embodiments of the present invention is advantageous in that the base station can command terminal-selective simultaneous channel measurement information feedback of interference between specific terminals.

Also, the selective channel feedback method according to embodiments of the present invention is advantageous in that the base station configures a control channel for a plurality of terminals and commands the terminals to perform channel information feedback without requiring an increase of control channel resources.

Also, the selective channel feedback method according to embodiments of the present invention is advantageous in terms of facilitating channel information feedback in any system supporting MU-MIMO transmission.

Although various embodiments of the present invention have been described using specific terms and details, the specification and drawings are to be regarded in an illustrative rather than a restrictive sense, and are intended to help understand, but not limit, the present invention. Thus the scope of the invention is defined only by the appended claims and their legal equivalents rather than the specification, and various alterations and modifications within the definition and scope of the claims are included.

What is claimed is:

1. A method for receiving channel state information by a base station supporting Multiuser Multiple-Input Multiple-Output (MU-MIMO) in a wireless communication system, the method comprising:
   identifying a group identifier for a plurality of terminals;
   transmitting, to the plurality of terminals, downlink control information on a physical downlink control channel (PDCCH), wherein a cyclic redundancy check (CRC) for the downlink control information is scrambled with the group identifier for the plurality of terminals; and
   receiving, from the plurality of terminals, channel state information on a physical uplink shared channel (PUSCH) in one transmission time interval (TTI) allocated for the plurality of terminals, wherein the channel state information is generated based on the PDCCH being decoded by using the group identifier, wherein a frequency resource, a cyclic shift value, a concatenating order and a control information bit size for each of the plurality of terminals are configured to the plurality of terminals by a higher layer signaling, wherein each channel state information from the plurality of terminals is received on a corresponding frequency resource within the PUSCH and is applied with a corresponding cyclic shift value, wherein the downlink control information transmitted on the PDCCH is generated by concatenating terminal-specific control information of each of the plurality of terminals according to the concatenating order, and wherein each of the terminal-specific control information includes a number of bits corresponding to the control information bit size, indicates which terminals of the plurality of terminals are to transmit the channel state information in the TTI, and indicates a resource to be measured for the channel state information for a corresponding terminal.

2. The method of claim 1, wherein the channel state information comprises information on at least one of a channel for Single User Multiple Input Multiple Output (SU-MIMO) or a channel for Multiple User Multiple Input Multiple Output (MU-MIMO).

3. The method of claim 1, wherein the channel state information comprises at least one of a Rank Indicator (RI), a Precoder Matrix Indicator (PMI), a Single User Channel Quality Indicator (SU-CQI) or a Multiuser CQI (MU-CQI).

4. The method of claim 1, wherein the channel state information is simultaneously received in the one TTI, and
wherein the channel state information from the plurality of terminals is received on different frequency resources.

5. A method for transmitting channel state information by a terminal supporting Multiuser Multiple-Input Multiple-Output (MU-MIMO) in a wireless communication system, the method comprising:
receiving, from a base station, downlink control information on a physical downlink control channel (PDCCH), wherein a cyclic redundancy check (CRC) for the downlink control information is scrambled with a group identifier for a plurality of terminals;
generating channel state information based on the PDCCH being decoded by using the group identifier; and
transmitting, to the base station, the channel state information on a physical uplink shared channel (PUSCH) in one transmission time interval (TTI) allocated for the plurality of terminals,
wherein a frequency resource, a cyclic shift value, a concatenating order and a control information bit size for each of the plurality of terminals are configured to the plurality of terminals by a higher layer signaling,
wherein each channel state information from the plurality of terminals is transmitted on a corresponding frequency resource within the PUSCH and is applied with a corresponding cyclic shift value,
wherein the downlink control information received on the PDCCH includes terminal-specific control information for the terminal concatenated with terminal-specific control information of each of the plurality of terminals according to the concatenating order, and
wherein each of the terminal-specific control information includes a number of bits corresponding to the control information bit size, indicates which terminals of the plurality of terminals are to transmit the channel state information in the TTI, and indicates a resource to be measured for the channel state information for a corresponding terminal.

6. The method of claim 5, wherein the channel state information comprises information on at least one of a channel for Single User Multiple-Input Multiple-Output (SU-MIMO) or a channel for Multiple User Multiple Input Multiple Output (MU-MIMO).

7. The method of claim 5, wherein the channel state information comprises at least one of a Rank Indicator (RI), a Precoder Matrix Indicator (PMI), a Single User Channel Quality Indicator (SU-CQI) or a Multiuser CQI (MU-CQI).

8. The method of claim 5, wherein the channel state information is transmitted simultaneously with the plurality of terminals in the one TTI, and
wherein the channel state information from the plurality of terminals is transmitted on different frequency resources.

9. A base station for receiving channel state information and supporting Multiuser Multiple-Input Multiple-Output (MU-MIMO) in a wireless communication system, the base station comprising:
a transceiver configured to transmit and receive a signal; and
a controller coupled with the transceiver and configured to:
identify a group identifier for a plurality of terminals,
control the transceiver to transmit, to the plurality of terminals, downlink control information on a physical downlink control channel (PDCCH), wherein a cyclic redundancy check (CRC) for the downlink control information is scrambled with the group identifier for the plurality of terminals, and
control the transceiver to receive, from the plurality of terminals, channel state information on a physical uplink shared channel (PUSCH) in one transmission time interval (TTI) allocated for the plurality of terminals,
wherein the channel state information is generated based on the PDCCH being decoded by using the group identifier,
wherein a frequency resource, a cyclic shift value, a concatenating order and a control information bit size for each of the plurality of terminals are configured to the plurality of terminals by a higher layer signaling,
wherein each channel state information from the plurality of terminals is received on a corresponding frequency resource within the PUSCH and is applied with a corresponding cyclic shift value,
wherein the downlink control information transmitted on the PDCCH is generated by concatenating terminal-specific control information of each of the plurality of terminals according to the concatenating order, and
wherein each of the terminal-specific control information includes a number of bits corresponding to the control information bit size, indicates which terminals of the plurality of terminals are to transmit the channel state information in the TTI, and indicates a resource to be measured for the channel state information for a corresponding terminal.

10. The base station of claim 9, wherein the channel state information comprises information on at least one of a channel for Single User Multiple-Input Multiple-Output (SU-MIMO) or a channel for Multiple User Multiple Input Multiple Output (MU-MIMO).

11. The base station of claim 9, wherein the channel state information comprises at least one of a Rank Indicator (RI), a Precoder Matrix Indicator (PMI), a Single User Channel Quality Indicator (SU-CQI) or a Multiuser CQI (MU-CQI).

12. The base station of claim 9, wherein the channel state information is simultaneously received in the one TTI, and
   wherein the channel state information from the plurality of terminals is received on different frequency resources.

13. A terminal for transmitting channel state information and supporting Multiuser Multiple-Input Multiple-Output (MU-MIMO) in a wireless communication system, the terminal comprising:
   a transceiver configured to transmit and receive a signal; and
   a controller coupled with the transceiver and configured to:
      control the transceiver to receive, from a base station, downlink control information on a physical downlink control channel (PDCCH), wherein a cyclic redundancy check (CRC) for the downlink control information is scrambled with a group identifier for a plurality of terminals,
      generate channel state information based on the PDCCH being decoded by using the group identifier, and
      control the transceiver to transmit, to the base station, the channel state information on a physical uplink shared channel (PUSCH) in one transmission time interval (TTI) allocated for the plurality of terminals,
   wherein a frequency resource, a cyclic shift value, a concatenating order and a control information bit size for each of the plurality of terminals are configured to the plurality of terminals by a higher layer signaling,
   wherein each channel state information from the plurality of terminals is transmitted on a corresponding frequency resource within the PUSCH and is applied with a corresponding cyclic shift value,
   wherein the downlink control information received on the PDCCH includes terminal-specific control information for the terminal concatenated with terminal-specific control information of each of the plurality terminals according to the concatenating order, and
   wherein each of the terminal-specific control information includes a number of bits corresponding to the control information bit size, indicates which terminals of the plurality of terminals are to transmit the channel state information in the TTI, and indicates a resource to be measured for the channel state information for a corresponding terminal.

14. The terminal of claim 13, wherein the channel state information comprises information on at least one of a channel for Single User Multiple-Input Multiple-Output (SU-MIMO) or a channel for Multiple User Multiple Input Multiple Output (MU-MIMO).

15. The terminal of claim 13, wherein the channel state information comprises at least one of a Rank Indicator (RI), a Precoder Matrix Indicator (PMI), a Single User Channel Quality Indicator (SU-CQI) or a Multiuser CQI (MU-CQI).

16. The terminal of claim 13, wherein the channel state information is transmitted simultaneously with the plurality of terminals in the one TTI, and
   wherein the channel state information from the plurality of terminals is transmitted on different frequency resources.

* * * * *